(12) United States Patent
Watté et al.

(10) Patent No.: US 12,158,610 B2
(45) Date of Patent: Dec. 3, 2024

(54) INTEGRATED OPTICAL WAVELENGTH DIVISION MULTIPLEXING DEVICES

(71) Applicant: COMMSCOPE TECHNOLOGIES LLC, Hickory, NC (US)

(72) Inventors: Jan Watté, Vlaams-Brabant (BE); David James Mather, Altrincham (GB); Jan Jozef Julia Maria Erreygers, Tielt-Winge (BE); Saurav Kumar, Kessel-Lo (BE); Vivek Panapakkam Venkatesan, Etterbeek (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 200 days.

(21) Appl. No.: 17/771,176

(22) PCT Filed: Oct. 23, 2020

(86) PCT No.: PCT/US2020/057059
§ 371 (c)(1),
(2) Date: Apr. 22, 2022

(87) PCT Pub. No.: WO2021/081323
PCT Pub. Date: Apr. 29, 2021

(65) Prior Publication Data
US 2022/0390676 A1    Dec. 8, 2022

Related U.S. Application Data
(60) Provisional application No. 62/926,122, filed on Oct. 25, 2019.

(51) Int. Cl.
*G02B 6/293* (2006.01)
*H04J 14/02* (2006.01)
*G02B 6/12* (2006.01)

(52) U.S. Cl.
CPC ..... *G02B 6/29364* (2013.01); *G02B 6/29367* (2013.01); *G02B 6/2938* (2013.01);
(Continued)

(58) Field of Classification Search
CPC ............ G02B 6/12007; G02B 6/29364; G02B 6/29365; G02B 6/29367; G02B 6/2938; H04J 14/0213
See application file for complete search history.

(56) References Cited

U.S. PATENT DOCUMENTS

| | | |
|---|---|---|
| 4,693,544 A | 9/1987 | Yamasaki et al. |
| 4,790,615 A | 12/1988 | Seki et al. |

(Continued)

FOREIGN PATENT DOCUMENTS

| | | |
|---|---|---|
| EP | 0 639 782 A1 | 2/1995 |
| EP | 0 844 503 A1 | 5/1998 |

(Continued)

OTHER PUBLICATIONS

International Search Report and Written Opinion of the International Searching Authority for International Patent Application No. PCT/US2020/057059 mailed Feb. 15, 2021, 13 pages.

(Continued)

*Primary Examiner* — Ryan A Lepisto
(74) *Attorney, Agent, or Firm* — Merchant & Gould P.C.

(57) ABSTRACT

Optical wavelength division multiplexing (WDM) devices include an optical chip having a number of waveguides therein, with a common optical fiber and single wavelength channel optical fibers optically coupled to the waveguides. Wavelength sensitive filters are disposed between the chip and the fibers, or across waveguides within the chip to reflect light at certain wavelengths and to transmit light at other wavelengths. In some embodiments, all of the fibers are located at the same end of the chip, in others the common (Continued)

fiber is located at one side of the chip and the single channel fibers located at another side, while in others the common fiber is located at a first side of the chip and the single channel fibers are located either at the first side of the chip or at a second side of the chip.

9 Claims, 21 Drawing Sheets

(52) U.S. Cl.
CPC ...... *H04J 14/0213* (2013.01); *G02B 6/12007* (2013.01); *G02B 6/29365* (2013.01)

(56) References Cited

U.S. PATENT DOCUMENTS

| | | | |
|---|---|---|---|
| 5,835,517 A | 11/1998 | Jayaraman et al. | |
| 5,936,763 A | 8/1999 | Mitsuda et al. | |
| 5,960,135 A | 9/1999 | Ozawa | |
| 6,167,171 A | 12/2000 | Grasis et al. | |
| 6,229,938 B1 | 5/2001 | Hibino et al. | |
| 6,264,377 B1 | 7/2001 | Mitsuda et al. | |
| 6,356,679 B1 | 3/2002 | Kapany | |
| 6,396,632 B1 | 5/2002 | Liu et al. | |
| 6,408,121 B1 | 6/2002 | Goto | |
| 6,456,767 B2 | 9/2002 | Terashima | |
| 6,495,766 B2 | 12/2002 | Takahashi | |
| 6,517,257 B2 | 2/2003 | Nishikawa et al. | |
| 6,546,171 B2 | 4/2003 | Fukutomi | |
| 6,563,976 B1 | 5/2003 | Grann et al. | |
| 6,621,954 B1 | 9/2003 | Xie et al. | |
| 6,684,012 B2 | 1/2004 | Kimura | |
| 6,711,325 B2 | 3/2004 | Hwang et al. | |
| 6,714,566 B1 | 3/2004 | Coldren et al. | |
| 6,748,143 B2 | 6/2004 | Kuhara et al. | |
| 6,775,439 B2 | 8/2004 | Takano et al. | |
| 6,801,679 B2 | 10/2004 | Koh et al. | |
| 6,856,722 B2 | 2/2005 | Sasaki et al. | |
| 6,876,679 B1 | 4/2005 | Bowler et al. | |
| 6,906,856 B1 | 6/2005 | DiJaili et al. | |
| 7,024,079 B2 | 4/2006 | Komiya et al. | |
| 7,039,279 B2 | 5/2006 | Tatehata et al. | |
| 7,044,649 B2 | 5/2006 | Furumochi et al. | |
| 7,065,269 B2 | 6/2006 | Higuchi et al. | |
| 7,106,980 B2 | 9/2006 | Nakanishi et al. | |
| 7,142,740 B2 | 11/2006 | Lee et al. | |
| 7,149,375 B2 | 12/2006 | Komiya et al. | |
| 7,172,344 B2 | 2/2007 | Nishihara et al. | |
| 7,181,098 B2 | 2/2007 | Kwon et al. | |
| 7,218,806 B2 | 5/2007 | Han et al. | |
| 7,245,793 B2 | 7/2007 | Kamei et al. | |
| 7,289,702 B2 | 10/2007 | Takahashi et al. | |
| 7,290,942 B2 | 11/2007 | Kuhara et al. | |
| 7,324,727 B2 | 1/2008 | Kim et al. | |
| 7,336,905 B2 | 2/2008 | Pyo et al. | |
| 7,366,381 B2 | 4/2008 | Tamaki et al. | |
| 7,403,676 B2 | 7/2008 | Kurihara et al. | |
| 7,421,157 B2 | 9/2008 | Ide et al. | |
| 7,457,497 B2 | 11/2008 | Takushima et al. | |
| 7,486,846 B2 | 2/2009 | Warashina et al. | |
| 7,492,992 B1 | 2/2009 | Tyan et al. | |
| 7,565,043 B2 | 7/2009 | Sugimoto | |
| 7,616,845 B2 | 11/2009 | Matsuoka et al. | |
| 7,724,990 B2 | 5/2010 | Ishida | |
| 7,843,644 B1* | 11/2010 | Wang ................ G02B 6/262 | |
| | | | 359/641 |
| 8,538,210 B2* | 9/2013 | Wang ................ G02B 6/29367 | |
| | | | 385/20 |
| 9,281,901 B2 | 3/2016 | Yamazaki | |
| 9,306,670 B2 | 4/2016 | Fujiwara et al. | |
| 9,341,786 B1 | 5/2016 | Gamache et al. | |
| 9,401,773 B1* | 7/2016 | Gui ................ G02B 6/29365 | |
| 9,482,819 B2* | 11/2016 | Li ................ G02B 6/2938 | |
| 9,541,714 B2 | 1/2017 | Lim et al. | |
| 9,551,833 B1* | 1/2017 | Li ................ H04J 14/02 | |
| 9,759,876 B2 | 9/2017 | Kim et al. | |
| 9,804,332 B1 | 10/2017 | Wang et al. | |
| 9,995,880 B1 | 6/2018 | Ding et al. | |
| 10,281,654 B2 | 5/2019 | Yue | |
| 10,313,045 B2* | 6/2019 | Xiao ................ G02B 6/2938 | |
| 10,371,897 B2* | 8/2019 | Yue ................ G02B 6/2938 | |
| 10,514,507 B1 | 12/2019 | Zhang et al. | |
| 10,551,569 B2* | 2/2020 | Gui ................ G02B 6/29365 | |
| 10,700,781 B2 | 6/2020 | Tang et al. | |
| 10,852,482 B1 | 12/2020 | Gui et al. | |
| 11,310,570 B2* | 4/2022 | Gui ................ H04J 14/02 | |
| 2002/0044721 A1 | 4/2002 | Bjorklund | |
| 2002/0097963 A1 | 7/2002 | Ukechi et al. | |
| 2003/0002787 A1 | 1/2003 | Honda et al. | |
| 2003/0044119 A1 | 3/2003 | Sasaki et al. | |
| 2003/0081924 A1 | 5/2003 | Yegnanarayanan et al. | |
| 2003/0095744 A1 | 5/2003 | Takano et al. | |
| 2003/0113067 A1 | 6/2003 | Koh et al. | |
| 2003/0123827 A1 | 7/2003 | Salerno et al. | |
| 2003/0223701 A1 | 12/2003 | Furumai et al. | |
| 2004/0096221 A1 | 5/2004 | Mahgerefteh et al. | |
| 2004/0141677 A1 | 7/2004 | Hanashima et al. | |
| 2004/0208458 A1 | 10/2004 | Uno et al. | |
| 2004/0223682 A1 | 11/2004 | Ding et al. | |
| 2004/0223692 A1 | 11/2004 | Tallone et al. | |
| 2004/0228573 A1 | 11/2004 | Terakawa et al. | |
| 2005/0031258 A1 | 2/2005 | Chiu et al. | |
| 2005/0152642 A1 | 7/2005 | Xu et al. | |
| 2005/0259910 A1 | 11/2005 | Li et al. | |
| 2006/0051030 A1 | 3/2006 | Lee et al. | |
| 2006/0065834 A1 | 3/2006 | Flanders et al. | |
| 2006/0072633 A1 | 4/2006 | Flanders et al. | |
| 2006/0088246 A1 | 4/2006 | Han et al. | |
| 2006/0153501 A1 | 7/2006 | Takahashi et al. | |
| 2006/0222297 A1 | 10/2006 | Watanabe | |
| 2006/0274999 A1 | 12/2006 | Wu et al. | |
| 2008/0025726 A1 | 1/2008 | Welch et al. | |
| 2008/0285974 A1 | 11/2008 | Takahashi et al. | |
| 2009/0016716 A1 | 1/2009 | Ishida | |
| 2009/0032984 A1 | 2/2009 | Iwase et al. | |
| 2009/0202244 A1 | 8/2009 | Jin et al. | |
| 2009/0226171 A1 | 9/2009 | Liu et al. | |
| 2010/0135619 A1 | 6/2010 | Choi et al. | |
| 2011/0135314 A1 | 6/2011 | Tolstikhin et al. | |
| 2014/0186040 A1 | 7/2014 | Fujiwara et al. | |
| 2015/0078749 A1 | 3/2015 | Yamazaki | |
| 2015/0168650 A1 | 6/2015 | Okamoto | |
| 2016/0191192 A1* | 6/2016 | Yue ................ G02B 6/2938 | |
| | | | 398/83 |
| 2016/0365928 A1 | 12/2016 | Xiao et al. | |
| 2017/0242195 A1 | 8/2017 | Lin et al. | |
| 2017/0254958 A1* | 9/2017 | Yue ................ H04J 14/0202 | |
| 2017/0285018 A1 | 10/2017 | Wilson et al. | |
| 2017/0329087 A1 | 11/2017 | Huh et al. | |
| 2018/0052266 A1 | 2/2018 | Mathai et al. | |
| 2018/0128983 A1 | 5/2018 | Huang et al. | |
| 2018/0217333 A1 | 8/2018 | Wattée et al. | |
| 2018/0220208 A1 | 8/2018 | Gui et al. | |
| 2018/0329146 A1 | 11/2018 | Dannenberg et al. | |
| 2019/0052362 A1 | 2/2019 | Peterson et al. | |
| 2019/0094463 A1 | 3/2019 | Hasegawa | |
| 2022/0128760 A1 | 4/2022 | Radosavljevic et al. | |
| 2024/0061180 A1 | 2/2024 | Kumar et al. | |

FOREIGN PATENT DOCUMENTS

| | | | |
|---|---|---|---|
| EP | 0 592 690 B1 | 10/1998 | |
| EP | 1 030 201 A1 | 8/2000 | |
| EP | 1 378 777 A2 | 1/2004 | |
| EP | 1 422 540 A2 | 5/2004 | |
| EP | 1 469 331 A1 | 10/2004 | |
| EP | 0 905 536 B1 | 12/2004 | |
| EP | 1 496 377 A2 | 1/2005 | |
| EP | 1 337 888 B1 | 4/2005 | |
| EP | 1 202 084 B1 | 12/2007 | |
| EP | 1 434 066 B1 | 4/2012 | |
| KR | 10-2011-0044048 A | 4/2011 | |
| KR | 10-1227651 B1 * | 1/2013 | ............ G02B 6/125 |

(56) References Cited

FOREIGN PATENT DOCUMENTS

| KR | 10-2016-0145956 A | 12/2016 |
|---|---|---|
| WO | 2013/188621 A1 | 12/2013 |
| WO | 2017/011258 A1 | 1/2017 |
| WO | 2019/176561 A1 | 9/2019 |
| WO | 2020/150618 A1 | 7/2020 |
| WO | 2020/181969 A1 | 9/2020 |
| WO | 2021/003664 A1 | 1/2021 |
| WO | 2021/042775 A1 | 3/2021 |
| WO | 2021/087123 A1 | 5/2021 |
| WO | 2022/120221 A1 | 6/2022 |

OTHER PUBLICATIONS

Zhang, Z. et al., "Polymer-based Passive Photonic Components with on-chip Fiber Grooves and Thin Film Filters", Fraunhofer Institute for Telecommunications, Conference Paper, 1-2 (Apr. 2010).

Zhang, Z., "Polymer Photonic Devices and Hybrid Integration on Silicon Platform", Fraunhofer Heinrich Hertz Institute, KTH Adopt Winger School, 1-53 (Jan. 2014).

Emadi et al., "Design and implementation of a sub-nm resolution microspectrometer based on a Linear-Variable Optical Filter," Optics Express, vol. 20, No. 1, pp. 489-507 (2012).

Han et al., "Fabrication of a TFF-Attached WDM-Type Triplex Transceiver Module Using Silica PLC Hybrid Integration Technology," Journal of Lightwave Technology, vol. 24, No. 12, pp. 5031-5038 (Dec. 2006).

Inoue et al., "Filter-embedded wavelength-division multiplexer for hybrid-integrated transceiver based on silica-based PLC," Electronics Letters, vol. 32, No. 9, pp. 847-848 (Apr. 25, 1996).

International Search Report and Written Opinion of the International Searching Authority for International Patent Application No. PCT/US2021/061880 mailed Mar. 30, 2022, 15 pages.

Kim et al., "Reduction of Insertion Loss of Thin Film Filters Embedded in PLC Platforms," IEEE Photonics Technology Letters, vol. 17, No. 7, pp. 1459-1461 (Jul. 2005).

Ko et al., "Two-dimensional analytical modeling of a linear variable filter for spectral order sorting," Applied Optics, vol. 55, No. 17, pp. 4531-4537 (Jun. 10, 2016).

Lee et al., "PLC Platform for Bidirectional Transceiver With Wide Multimode Output Waveguide to Receiver," IEEE Photonics Technology Letters, vol. 17, No. 1, pp. 205-207 (Jan. 2005).

Mizuno et al., "Integrated 1.3/1.5 µm cyclic AWG router for λ-tunable WDM/TDM-PON," Optics Express, vol. 20, No. 26, pp. B1-B6 (Dec. 10, 2012).

Rho et al., "WDM-PON Module Using a Planar Lightwave Circuit With a Coated WDM Filter," IEEE Photonics Technology Letters, vol. 18, No. 17, pp. 1867-1869 (Sep. 2006).

Tang et al,. "Preparation and Spectrum Characterization of a High, Quality Linear Variable Filter," Coatings, 8, 308; doi:10.3390/coatings8090308, 11 pages (2018).

Extended European Search Report for Application No. 20879004.8 mailed Oct. 17, 2023.

\* cited by examiner

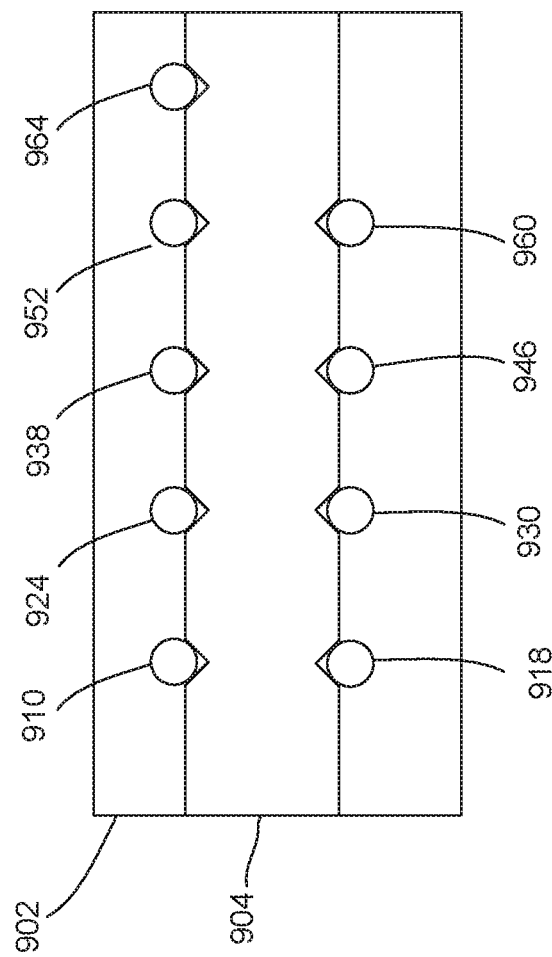

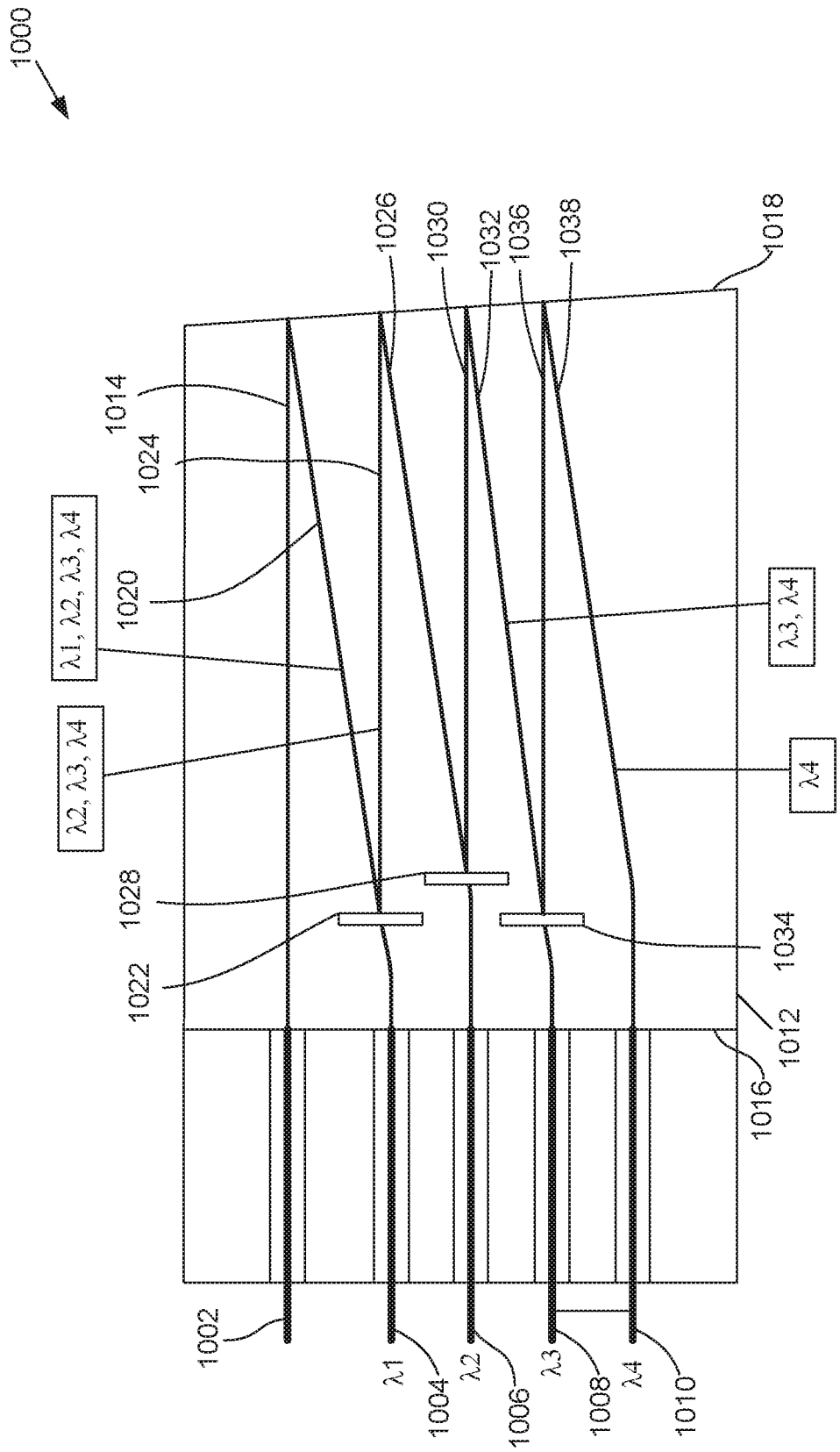

INTEGRATED OPTICAL WAVELENGTH DIVISION MULTIPLEXING DEVICES

CROSS-REFERENCE TO RELATED APPLICATION

This application is a National Stage Application of PCT/US2020/057059, filed on Oct. 23, 2020, which claims the benefit of U.S. Patent Application Ser. No. 62/926,122, filed on Oct. 25, 2019, the disclosures of which are incorporated herein by reference in their entireties. To the extent appropriate, a claim of priority is made to each of the above disclosed applications.

FIELD OF THE INVENTION

The present invention is generally directed to optical communications, and more specifically to optical devices that are used for wavelength division multiplexing and demultiplexing having reduced size and complexity.

BACKGROUND OF THE INVENTION

One of the most important approaches to increasing the data handling capacity of a fiber network is to use wavelength division multiplexing (WDM) in which an optical fiber carries multiple optical signals, each at a different wavelength. This requires the use of WDM components for mixing (multiplexing) or separating (demultiplexing) the signals at their respective wavelengths.

In one prior art approach implementing a WDM multiplexer/demultiplexer (mux/demux), the multiplexed optical signal is emitted from a common fiber to a cascade of wavelength dependent filters which transmit light at one of the channel wavelengths and reflect light at the other channel wavelengths. As the combined optical signal propagates in a zig-zag manner along the cascade of filters, the signal at one of the channel wavelengths is removed from the combined signal at each filter. In these devices, the optical signals propagate in free space, or along fibers between the filters, between the common fiber and the individual optical channel fibers, which requires the use of lenses to collimate the light out of the common fiber and to focus the light transmitted by each filter into the individual channel fibers. The lenses and filters are mounted on a substrate, often formed of a ceramic or metal material. In some cases, the optical fibers are pigtailed to their respective lenses, for example where the lens is a gradient index (GRIN) lens. Assembly of these devices requires expensive pick and place mechanisms.

In some approaches, the fibers are attached at two sides of the WDM device. In other approaches, the fibers are all located to one side of the WDM device. In this latter approach, the convenience of having all the fibers positioned on one side of the WDM is offset by the need to include reflectors, often in the form of retroreflecting prisms, with the result that the device needs more components to be accurately placed and aligned during manufacture, thus increasing its cost.

There is a need, therefore, to reduce the complexity of WDM devices, for example, for WDM devices that use fewer components, require simpler manufacturing techniques and, therefore, can be produced at reduced cost. Furthermore, it would be advantageous to use an integrated approach as the resulting WDM device would be more robust than one made of discrete components.

SUMMARY OF THE INVENTION

One embodiment of the invention is directed to an optical device that includes an optical chip having an input/output portion, a waveguide portion and a retroreflecting portion. First, second and third optical fibers are disposed at the input/output portion. There exists a first guided optical path through the optical chip between the first optical fiber and the second optical fiber for light at a first wavelength and a second guided optical path through the optical chip between the first optical fiber and the third optical fiber for light at a second wavelength different from the first wavelength. A first wavelength selective filter is disposed to receive light from the first optical fiber. One of the first and second guided optical paths includes transmission through the first wavelength selective filter and the other of the first and second optical guided paths includes reflection at the first wavelength selective filter. At least one of the first and second guided optical paths passes through the retroreflecting portion.

Another embodiment of the invention is directed to an optical device that includes an optical chip having first face and a second face. There is a first optical fiber at the first face, a second optical fiber at the second face and a third optical fiber at the first face. There exists a first guided optical path through the optical chip between the first optical fiber and the second optical fiber for light at a first wavelength and a second guided optical path through the optical chip between the first optical fiber and the third optical fiber for light at a second wavelength different from the first wavelength. A first wavelength selective filter is disposed to receive light from the first optical fiber. The first guided optical path includes transmission through the first wavelength selective filter to the second fiber and the second guided optical path includes reflection at the first wavelength selective filter.

Another embodiment of the invention is directed to an optical device that includes an optical chip having a first face. There is a first optical fiber. There is also a second optical fiber at the first face and a third optical fiber at the first face. There exists a first guided optical path through the optical chip between the first optical fiber and the second optical fiber for light at a first wavelength and a second guided optical path through the optical chip between the first optical fiber and the third optical fiber for light at a second wavelength different from the first wavelength. A first wavelength selective filter is disposed to receive light from the first optical fiber. The first guided optical path includes transmission through the first wavelength selective filter to the second fiber and the second guided optical path includes reflection at the first wavelength selective filter.

Another embodiment of the invention is directed to an optical device that includes an optical chip having a first face, a first optical fiber at the first face. The optical device also includes a second optical fiber and a third optical fiber. There is a first guided optical path through the optical chip between the first optical fiber and the second optical fiber for light at a first wavelength, and a second guided optical path through the optical chip between the first optical fiber and the third optical fiber for light at a second wavelength different from the first wavelength. A first wavelength selective filter is disposed to receive light from the first optical fiber. The first guided optical path includes one of reflection and transmission at the first wavelength selective filter to the second optical fiber. The second guided optical path includes the other of reflection and transmission at the first wavelength selective filter. There is an array waveguide grating on the optical chip. Between the first wavelength selective filter and the third optical fiber, the second optical path passes through the array waveguide grating.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 9B schematically illustrates an end view of the input/output portion of the WDM mux/demux device of FIG. 9A, according to an embodiment of the present invention;

FIG. 10 schematically illustrates a top view of an integrated WDM mux/demux device having a common fiber and the single channel fibers at one end of the optical chip, according to another embodiment of the present invention;

Figure 1:
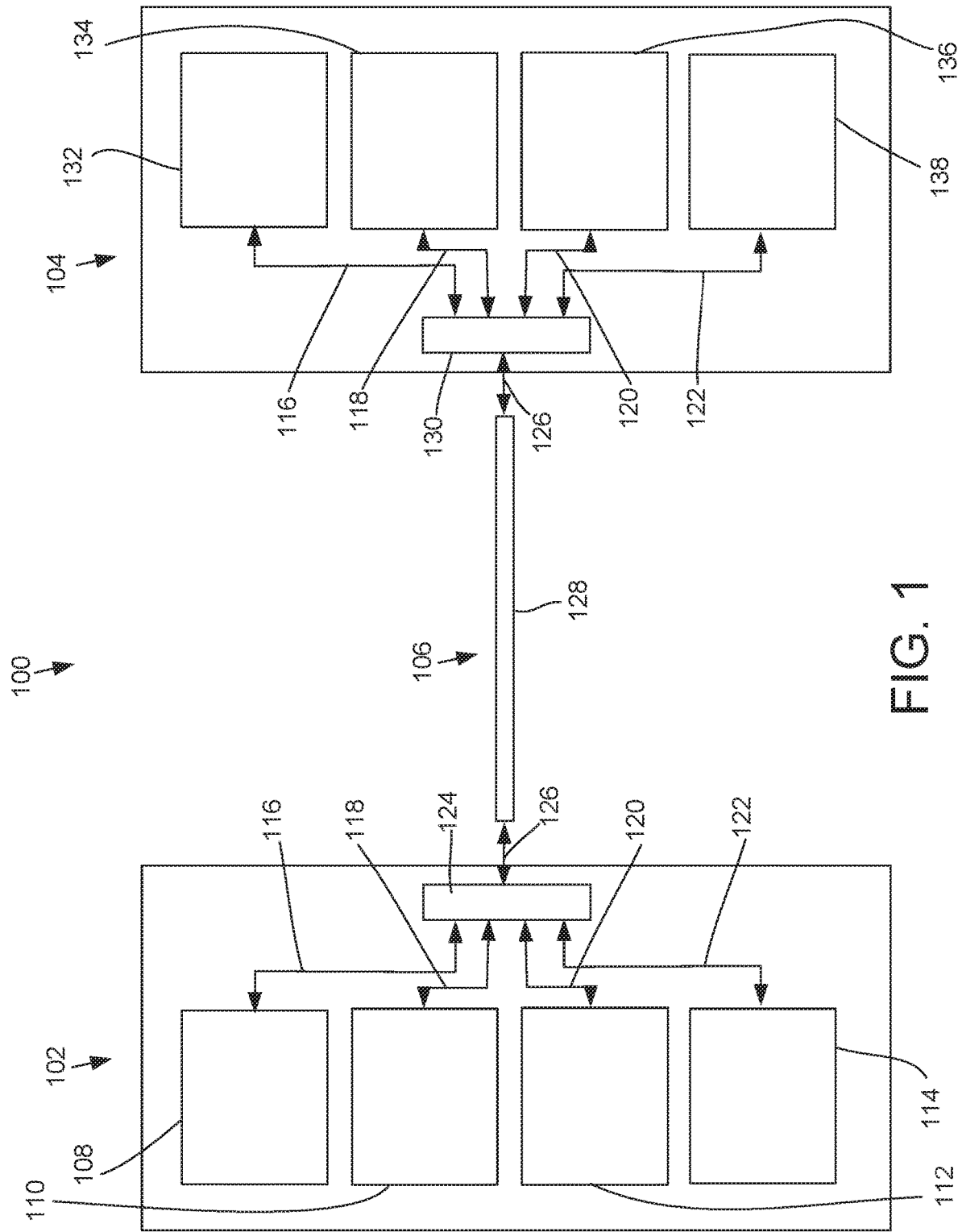
FIG. 1 schematically illustrates an optical communications system that uses a wavelength division multiplexing (WDM) multiplexer/demultiplexer (mux/demux)

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to providing optical devices for wavelength division multiplexing (WDM) that provide increased operational capabilities with reduced manufacturing costs.

FIG. 1 schematically illustrates an embodiment of an optical communications system 100 that uses WDM to increase the data handling capacity of an optical fiber. The optical communication system 100 generally has a transmitter portion 102, a receiver portion 104, and a fiber optic portion 106. The fiber optic portion 106 is coupled between the transmitter portion 102 and the receiver portion 104 for transmitting an optical signal from the transmitter portion 102 to the receiver portion 104.

Optical signals at different wavelengths are generated within the transmitter portion 102 and are combined into the optical fiber 128 of the optical fiber portion 106 and are transmitted to the receiver portion 104, where the signals that propagated along the fiber 128 are spatially separated and directed to respective detectors. The illustrated embodiment shows an optical communication system 100 that multiplexes signals at four different wavelengths, although it will be appreciated that optical communications systems may multiplex different numbers of signals, e.g. two, eight, sixteen etc.

The transmitter portion 102 may include multiple transmitter units 108, 110, 112, 114 producing respective optical signals 116, 118, 120, 122 at different wavelengths, λ1 λ2, λ3, λ4. The optical communication system 100 may operate at any useful wavelength for optical communications, for example in the range 800-950 nm, or over other wavelength ranges, such as 1250 nm-1350 nm, 1500 nm-1600 nm, or 1600 nm-1650 nm. The signals 116, 118, 120, 122 are coupled to the optical fiber system 106 via a WDM multiplexer/demultiplexer ("mux/demux") 124, that directs the optical signals 116, 118, 120, 122 along the core of the fiber 128. A WDM mux/demux is an optical device that, for light traveling in one direction, combines two or more spatially separated optical signals at different wavelengths into a single fiber and, for light propagating in the opposite direction, splits light from a single fiber into two or more spatially separated optical signals at different wavelengths. The optical signals 116, 118, 118, 120 may be delivered to the mux/demux 124 via respective fibers (not shown).

The combined signal 126 from the WDM mux/demux 124 contains components at each of the wavelengths of the signals that were combined in the WDM mux/demux 124 and is transmitted into the optical fiber 128. The combined signal 126 propagates along the optical fiber system 106 to the receiver portion 104, where it is separated by a second WDM mux/demux 130 into the original optical signals 116, 118, 120, 122. The first optical signal 116, at wavelength λ1, is directed to the first receiver unit 132. The second optical signal 118, at wavelength λ2, is directed to the second receiver unit 134. The third optical signal 120, at wavelength λ3, is directed to the third receiver unit 136, and the fourth optical signal 122, at wavelength λ4, is directed to the fourth receiver unit 138.

In many optical communications systems there are optical signals propagating in both directions along an optical fiber. This possibility is indicated in FIG. 1, where the optical signals 116, 118, 120, 122 are designated with double-headed arrows. In such a case, the transmitter units 108, 110, 112, 114 and receiver units 132, 134, 136, 138 may be transceiver units that generate and receive signals at different wavelengths. In other embodiments, there may be a separate transmitter unit and receiver unit for a signal at each end of the optical fiber system 106. In other embodiments still, there may be one or more optical circulators to separate transmitted and received signals at an end of the system 100. In such a case, there may be an optical circulator located within each transceiver unit, in which case each optical circulator operates only on a single optical channel. In other embodiments, an optical circulator may be positioned next to the optical fiber portion 106 to separate signals propagating in different directions, in which case the optical circulator may be coupled to a first mux/demux that serves a number of transmitter units and a second mux/demux that serves a number of receiver units.

The spacing between adjacent wavelength signals, also referred to as channels, is set by the particular WDM system being used. In some systems, the separation between wavelength channel may be 20 nm. In other words, a first channel may have a wavelength of 1310 nm and the next channel has a wavelength of the 1330 nm. In other systems, the separation between other channels may be less, for example 2 nm.

Figure 2A:
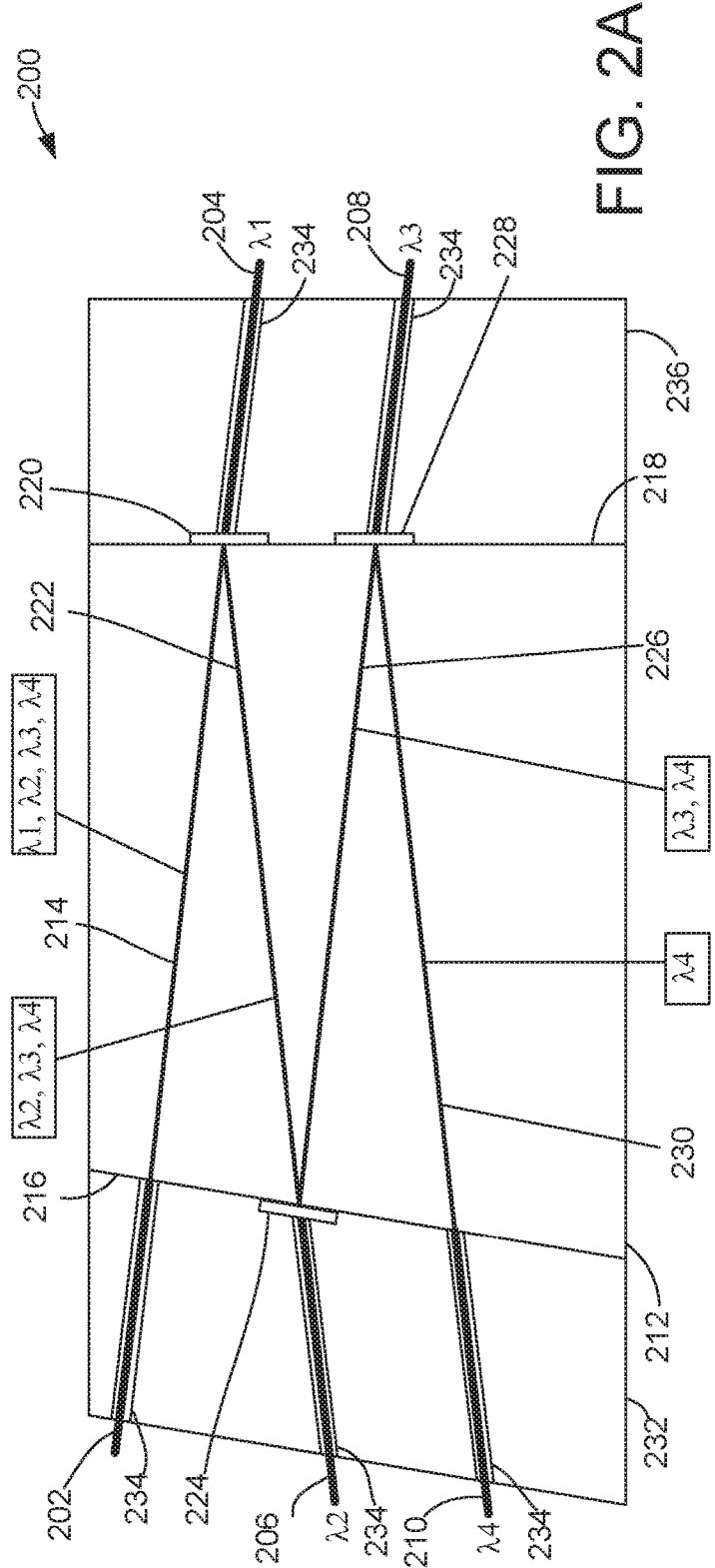
FIGS. 2A and 2B schematically illustrate top and side views respectively of an integrated WDM mux/demux device having single channel fibers at both ends, according to an embodiment of the present invention.

A first embodiment of an integrated WDM mux/demux device 200 according to the present invention is schematically illustrated in FIG. 2A. For this discussion, the device 200 will be described in terms of a combined light signal entering a common fiber 202, and light of separate wavelength channels being transmitted away from the device 200 along respective single channel fibers 204, 206, 208, 210. The device 200 includes an integrated chip 212 having a first waveguide 214 passing between a first chip face 216 and a second chip face 218. The common fiber 202 is aligned with the end of the first waveguide 214 at the first face 216 so that the combined optical signal passes along the first waveguide 214 towards the second face 218.

A first filter 220 is mounted at the end of the first waveguide 214 at the second face 218. The first filter 220 is wavelength selective and may include a multilayer dielectric coating on a substrate. In this embodiment of mux/demux, the multilayer dielectric coating on the first filter 220 transmits light at one of the wavelengths of the combined optical signal, while reflecting the optical signals at the other wavelengths. For example, the combined optical signal may include separate signals at λ1, λ2, λ3 and λ4. In such a case, the first filter 220 may transmit light at λ1, and reflect light at λ2, λ3 and λ4. It will be understood that this embodiment of the invention may be modified to handle a different number of optical channels, N, and is not limited to handling just four.

The signal at λ1 is transmitted through the first filter 220 to the first single channel fiber 204. The reflected signal, containing the signals at λ2, λ3 and λ4 is reflected along a second waveguide 222 towards the first face 216. A second filter 224 is positioned at the end of the second waveguide 222 at the first face 216. The second filter 224 transmits one of the remaining optical signals, for example the optical signal at λ2, and reflects the remaining signals at λ3 and λ4. The signal at λ2 is transmitted through the second filter 224 to the second single channel fiber 206. The signal reflected at the second filter 224, containing signals at λ3 and λ4, is transmitted along the third waveguide 226 back towards the second face 218. A third filter 228 is positioned at the end of the third waveguide 226 at the second face 218. The third filter 228 transmits one of the remaining optical signals, for example the optical signal at λ3, and reflects the remaining signal at λ4. The signal at λ3 is transmitted through the third filter 228 to the third single channel fiber 208. The signal at λ4 is reflected by the third filter 228 along a fourth waveguide 230 towards the first face 216. The fourth single channel fiber 210 is located at the first face 216 to receive the optical signal at λ4 from the fourth waveguide 230.

The optical chip 212 may be made of any suitable material that can be manufactured to contain waveguides, including glass, such as silica glass, silicon or silicon nitride. One of ordinary skill will understand that the choice of chip material will depend on the wavelength of the optical signals it is to process. For example, if the optical signals are in the range of 800-950 nm, then silica glass may be more suitable than silicon, as the absorption coefficient of silica is significantly less than that of silicon at that wavelength range. On the other hand, silicon may be considered to be more suitable if the optical signals are in the range 1500-1600 nm, where silicon's absorption coefficient is significantly reduced.

The optical chip 212, that includes the waveguides 214, 222, 226, 230 may be formed using standard lithographic methods, or using other methods, such as via 3-D femtosecond laser writing. 3-D femtosecond laser writing of waveguides has been discussed, for example, in U.S. Patent Application No. 62/866,275, incorporated by reference.

The different fibers, including the common fiber 202, and the single channel fibers 204, 206, 208, 210, may be single mode fibers or multimode fibers, depending on the optical system being used. Likewise, the waveguides 214, 222, 226, 230 may be single mode or multimode waveguides. The fibers 202, 204, 206, 208, 210 may be aligned to the respective waveguides in the chip 212 using any suitable method.

Figure 2B:
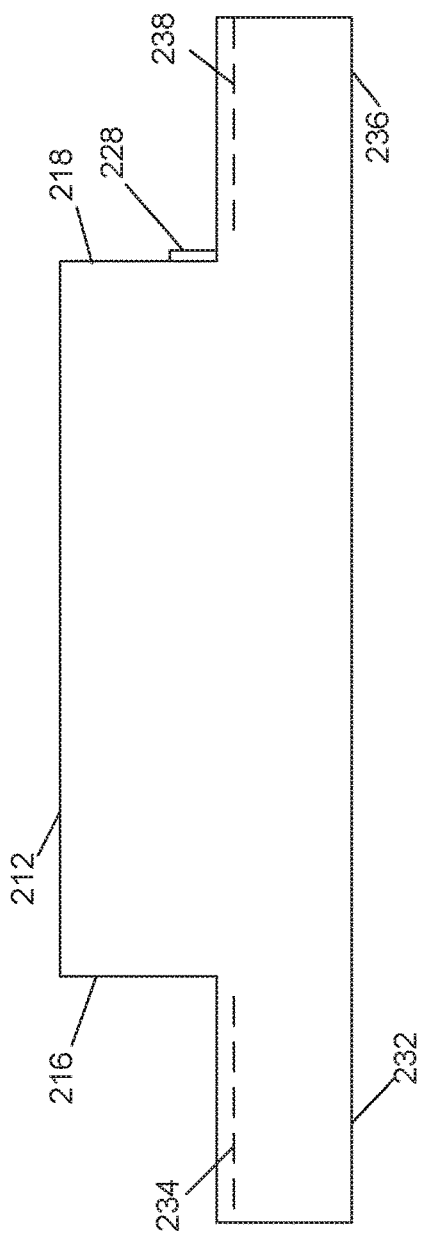

In the illustrated embodiment, the common fiber 202 and the second and fourth single channel fibers 206, 210 are mounted close to the first face 216 using a first alignment block 232 that contains respective alignment features 234. In some embodiments, the alignment features 234 may include a groove, such as a v-groove, that the fiber sits in so that its axis is coincident with the axis of the respective waveguide at the first face 216. Likewise, the first and third single channel fibers 204, 208 may be mounted close to the second face 218 using a second alignment block 236 that contains respective alignment features 238. FIG. 2B schematically illustrates a side view of the chip 212, without fibers attached, showing the mounting blocks 232, 236 and alignment features 234, 238 (shown as dashed lines).

The first and second alignment blocks 232, 236 may be formed integrally with the chip 212, as illustrated. Approaches for forming integrated alignment blocks with an optical chip are discussed, for example, in U.S. patent application Ser. No. 15/745,313, now U.S. Pat. No. 10,735,519, incorporated herein by reference. One approach for forming an integrated alignment block is to use femtosecond 3D processing to make the treated glass more susceptible to an etchant than untreated glass. Thus, if the device 200 is formed using femtosecond laser processing for etching and femtosecond laser 3-D writing of the waveguides, then the entire chip 212 integrated with the alignment blocks 232, 236 may be formed in a single femtosecond laser processing operation.

Thus, the device 200 has a first guided optical path for light at $\lambda 1$ between the common fiber 202 and the first single channel fiber 204, via the first waveguide 214, and a second optical path for light at $\lambda 2$ via the first waveguide 214 and the second waveguide 222. A guided optical path is an optical path along at least a portion of which propagation of the light is guided, for example by propagation along a waveguide. The first filter 220 receives light from the common fiber 202. The light at $\lambda 1$ is transmitted through the first filter 220 to the first single channel fiber and the light at $\lambda 2$ is reflected by the first filter 220 towards the second single channel fiber 406.

Microstructures can be fabricated in fused silica by femtosecond laser-assisted chemical etching of irradiated volumes in fused silica glass. The volumes exposed to femtosecond laser radiation have higher etch rate than unexposed glass and can be selectively removed in the subsequent wet etching step in aqueous solutions of potassium hydroxide (KOH) or hydrofluoric acid (HF). The use of KOH rather than HF has been found to produce a significantly improved selectivity between the exposed and unexposed regions, which allows for fabrication of high-aspect-ratio features with controllable and uniform width.

A multi-scan technique is used to expose the channel volume that is to be etched to form the channel. The volume of material to be removed is exposed to the focused femtosecond laser beam by scanning the unprocessed chip past the focus of a femtosecond laser. One suitable layer system for this is an ytterbium-doped fiber laser (Satsuma model, available from Amplitude Systèmes, Pessac, France) frequency doubled to produce a wavelength of 515 nm. The pulse length is <400 fs at a repetition rate of 500 kHz. The laser beam is linearly polarized and may be focused using a low NA lens, such as a 0.6 NA aspheric lens (Newport 5722-A-H). The chip being processed may be mounted on a motorized stage that can be translated at speeds, for example, in the range of 1-10 mm/s. Average processing laser power may be in the range of 50-250 mW and average vertical step size in the range of 1-2 µm.

The filters 220, 228 may be attached to the second face 218, and the filter 214 attached to the first face 216, using a suitable optical adhesive, such as a UV cured epoxy. The faces 216, 218 need not be polished flat for mating to the filters, as any adhesive between the filters and their respective faces may act as an index matching fluid that optically compensates for surface roughness of the faces 216, 218. The filters 220, 224, 228 may be formed using a substrate of any suitable thickness. In some embodiments, the filter substrates may be as thin as 20 µm, while in other embodiments the filter substrates may have a larger thickness, for example more than 100 µm thick.

The fibers attached to the device 200 and the other devices described herein, may, in some embodiments, be fiber pigtails for easy connection to a larger fiber network.

Figure 3:
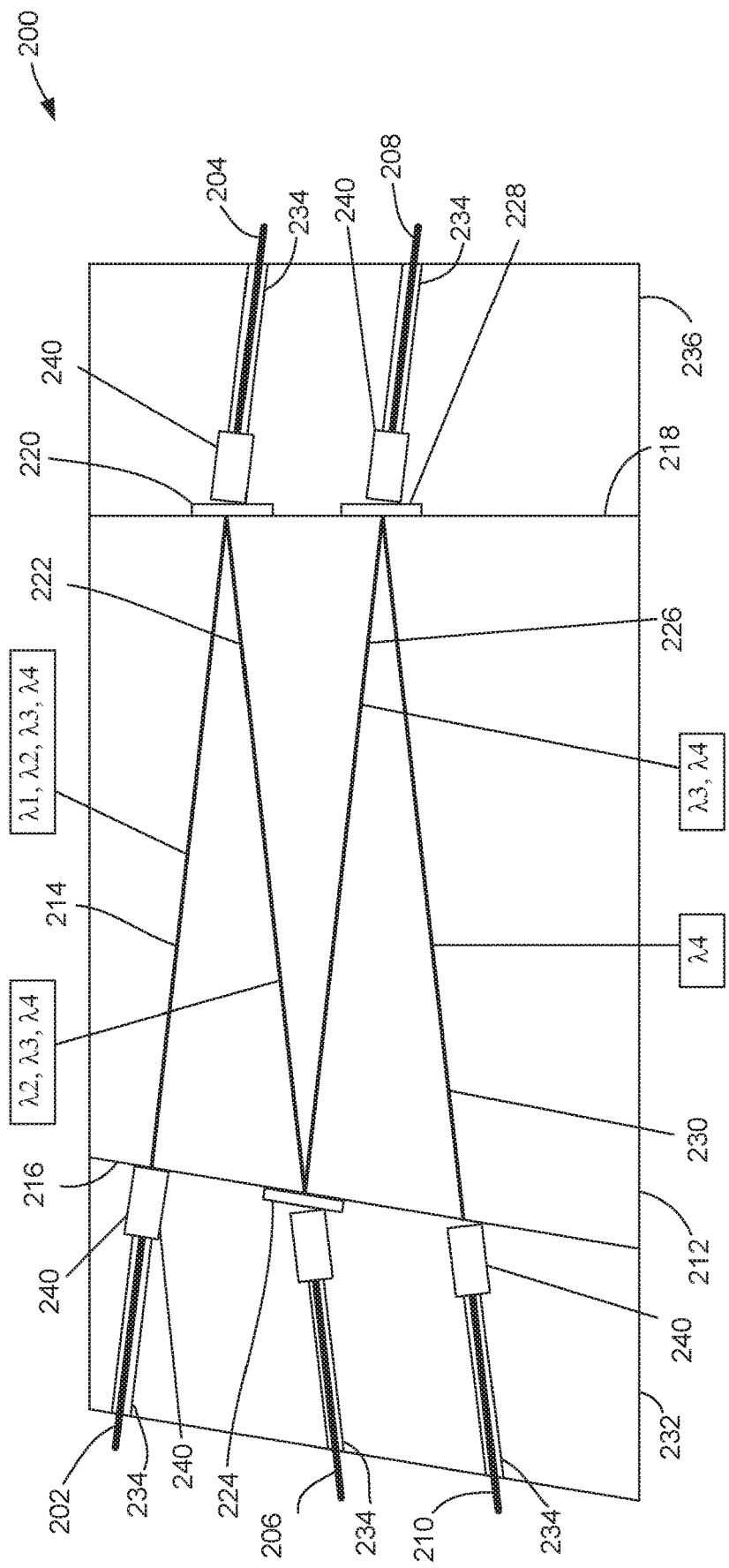
FIG. 3 schematically illustrates a top view of an integrated WDM mux/demux device having single channel fibers are both ends and employing lenses for coupling between the optical chip and the optical fibers, according to another embodiment of the present invention.

The separation between the end of a waveguide, for example the end of the first waveguide 214 at the second face 218 and the first single channel fiber 204 is reduced when the substrate of the first filter 220 is reduced. In some embodiments, the transmission losses produced when the first single channel fiber 204 is butted up against the outer side of the first filter 220 attached at the end of the first waveguide 214 may be acceptable when the filter 220 is formed with a thin substrate, for example around 20 µm. In other embodiments, there may be a focusing element, such as a lens, located between the end of the fiber and its respective filter to couple the light between the fiber and the waveguide. Such an embodiment is schematically illustrated in FIG. 3, where focusing elements 240 are disposed between each fiber 202, 204, 206, 208, 210 and the chip 212. The focusing elements 240 may be any suitable type of lens. In the illustrated embodiment, the lenses 240 are gradient index (GRIN) lenses.

Figure 4A:
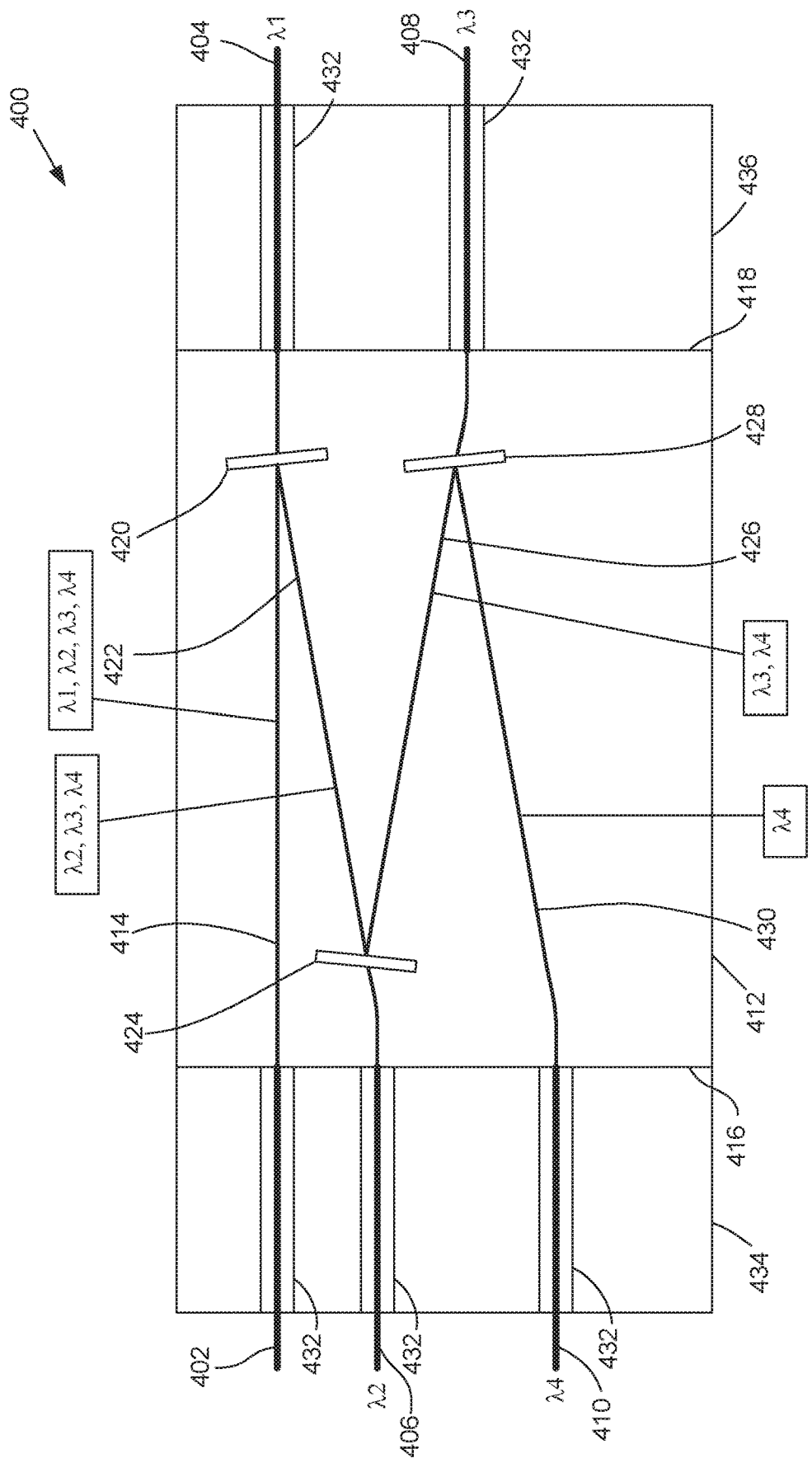
FIG. 4A schematically illustrates a top view of an integrated WDM mux/demux device having single channel fibers at both ends of the optical chip, according to another embodiment of the present invention.

In the embodiments just described, in order to separate the reflected light from the incident at a reflective filter, the end faces 216, 218 of the chip are not parallel to each other and the fibers are not all parallel to each other either. Another embodiment of integrated mux/demux device 400, in which the fibers may be placed parallel to each other, is schematically illustrated in FIG. 4. Like above, the device 400 is described in terms of a combined light signal entering a common fiber 402, and light of separate wavelength channels being transmitted away from the device 400 along respective single channel fibers 404, 406, 408, 410, although one of ordinary skill will understand that the device may also operate in the reverse direction, with light entering from the single channel fibers 404, 406, 408, 410, and leaving the device 400 via the common fiber 402. The device 400 includes an integrated chip 412 having a first waveguide 414 between a first chip face 416 and a second chip face 418. The common fiber 402 is aligned with the end of the first waveguide 414 at the first face 416 so that the combined optical signal passes along the first waveguide 414 towards the second face 418.

A first reflective filter 420 is mounted across the first waveguide 414. The first filter 420 includes a multilayer dielectric coating on a substrate. In this embodiment, the multilayer dielectric coating on the first filter 420 transmits light at one of the wavelengths of the combined optical signal, while reflecting the optical signals at the other wavelengths. For example, the combined optical signal may include separate signals at $\lambda 1$, $\lambda 2$, $\lambda 3$ and $\lambda 4$. In such a case, the first filter 420 may transmit light at $\lambda 1$, and reflect light at $\lambda 2$, $\lambda 3$ and $\lambda 4$. It will be understood that this embodiment of the invention may be modified to handle different numbers of optical channels, and is not limited to handling just four.

The signal at $\lambda 1$ is transmitted through the filter 420 to the first single channel fiber 404, which is aligned with the first waveguide 414. Methods of inserting a filter into the waveguide are discussed below. The reflected signal, containing the signals at $\lambda 2$, $\lambda 3$ and $\lambda 4$ is reflected along a second waveguide 422 towards the first face 416. A second filter 424 is positioned across the second waveguide 422. The second filter 424 transmits one of the remaining optical signals, for example the optical signal at $\lambda 2$, and reflects the remaining signals at $\lambda 3$ and $\lambda 4$. The signal at $\lambda 2$ is transmitted through the second filter 424 and along the remainder of the second waveguide 422 to the second single channel fiber 406, which is aligned to the second waveguide 422.

The signal reflected at the second filter 424, containing signals at $\lambda 3$ and $\lambda 4$, is transmitted along a third waveguide 426 back towards the second face 418. A third filter 428 is positioned across the third waveguide 426. The third filter 428 transmits one of the remaining optical signals, for example the optical signal at $\lambda 3$, and reflects the remaining signal at $\lambda 4$. The signal at $\lambda 3$ is transmitted through the third filter 428 and along the remainder of the third waveguide to the third single channel fiber 408. The signal at $\lambda 4$ is reflected by the third filter 428 along a fourth waveguide 430 towards the first face 416. The fourth single channel fiber 410 is located at the first face 416 and is aligned to the fourth waveguide 430 to receive the optical signal at $\lambda 4$ from the fourth waveguide 430.

As discussed above, the optical chip 412 may be formed of any suitable material and the waveguides may be formed using the techniques discussed above. The different fibers, including the common fiber 402, and the single channel fibers 404, 406, 408, 410, may be single mode fibers or multimode fibers, depending on the optical system being used. Likewise, the waveguides 414, 422, 426, 430 may be single mode or multimode waveguides. The fibers 402, 404, 406, 408, 410 may be aligned to the respective waveguides in the chip 412 using any suitable method. In the illustrated embodiment, the fibers 402, 404, 406, 408, 410 are each contained within a respective alignment feature 432, such as a v-groove, on an alignment block 434, 436. The alignment blocks 434, 436 are illustrated as being integrally formed with the chip 412 and may be formed using any of the processes discussed above.

The filters 420, 424, 428 are located in wells in the chip 412 that are located across the waveguides 414, 422, 426 respectively. The wells can be made using the same femtosecond laser processing techniques discussed above for preparing a glass material to be preferentially etched, whereby a nonlinear interaction between the glass and the focused light results in the glass being more amenable to etching than unprocessed material. Such processes are discussed in greater detail in U.S. Patent Application No. 62/866,275, incorporated herein by reference. Repositioning the focus repeatedly in three dimensions defines the volume of material that will be removed by etching to form the well. Experiments have shown that a high aspect ratio feature such as a well having an interwall spacing of as little as 20 µm can be made to a depth of a few 100s of µm. When a well this thin crosses a waveguide, the losses experienced when the light propagates in free space from one part of the waveguide to the other can be acceptable. For example, a well having a 20 µm width may produce a loss of around 0.2 dB at for light at a wavelength of 1550 nm.

Thus, the device 400 has a first guided optical path for light at $\lambda 1$ between the common fiber 402 and the first single channel fiber 404, via the first waveguide 414, and a second optical path for light at $\lambda 2$ between the common fiber 402 and the second single channel fiber 406 via the first waveguide 414 and the second waveguide 422. The first filter 420 receives light from the common fiber 202. The light at $\lambda 1$ is transmitted through the first filter 220 to the first single channel fiber and the light at $\lambda 2$ is reflected by the first filter 420 towards the second single channel fiber 406.

Figure 4B:
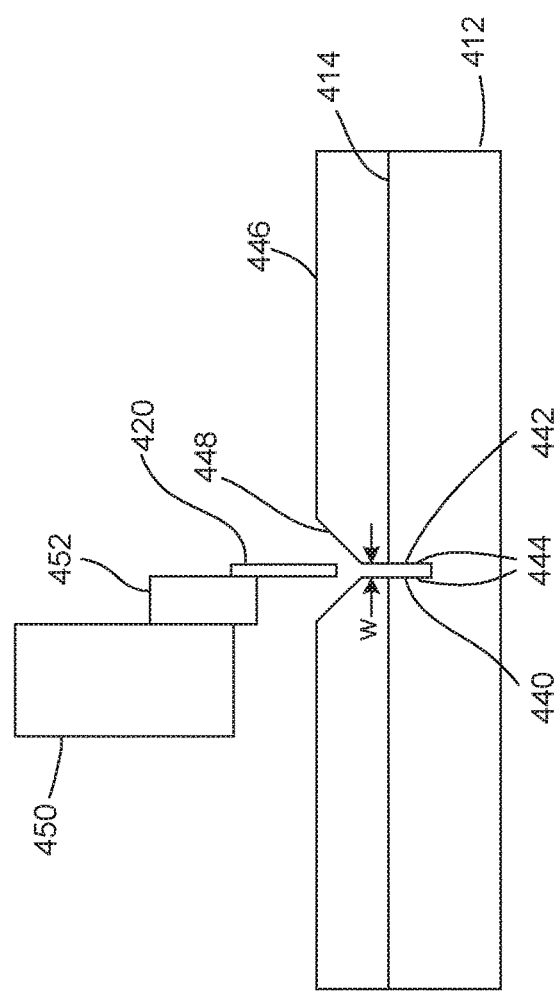
FIGS. 4B and 4C schematically illustrate detailed side and top views respectively of a filter being inserted in a well on an optical chip, according to another embodiment of the present invention.

FIG. 4B schematically illustrates how the filter 420 can be inserted into a well 440 in the chip 412. The figure shows a cross section through the chip 412, showing the first waveguide 414. The well 440 has been etched using the process discussed above. The well 440 has two parts. In the lower part 442 the sidewalls 444 are parallel to each other and perpendicular to the upper surface 446 of the chip 412. The sidewalls 444 may be separated by a distance, w, of 20 µm or less. The lower part 442 of the well crosses the waveguide 414. In the upper part 448, the sidewalls form a taper, which aids in the placement of the filter 420 into the well 440.

Exemplary apparatus for placing the filter 420 in the well is schematically illustrated above the chip. A gripper or chuck 450, for example a vacuum chuck, holds a glass support 452. The filter 420 is held on the glass support 452 via a gel film. Using a 3-D precision translation stage, the chuck 450 is moved so that the filter 420 is directly above the well 440. The chuck 450 is then moved closer to the chip 412 so that the filter slips into the well 440. Some adhesive may be provided on the faces of the filter 420 prior to insertion in the well so that, once inserted into the well 440, the filter 420 is adhered to the sidewalls 444. The adhesive may also act as an index matching medium between the material of the chip 412 and the material of the filter 420, so as to reduce reflective losses. Once the filter 420 is located in the well 440, it may be mechanically removed from the glass support 452, for example the chuck 450 may move in a direction into the illustration, resulting in the filter 420 sliding off the glass support 452.

Figure 4C:
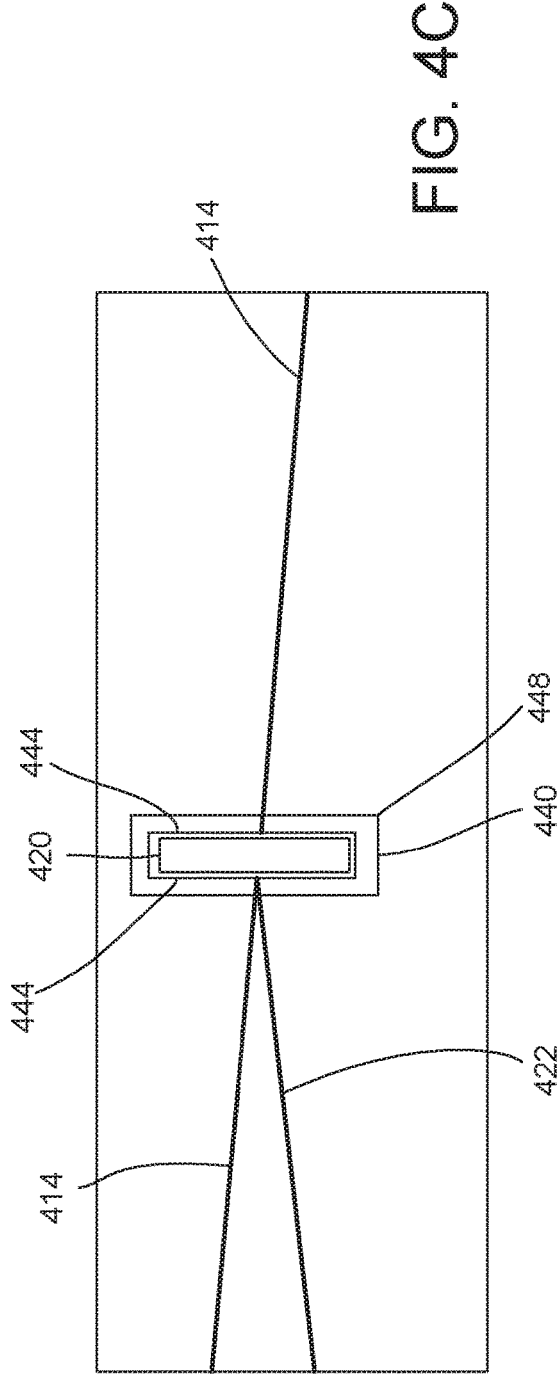

A top view of the filter 420 in the well 440 is schematically shown in FIG. 4C. The well is slightly oversized relative to the filter 420, to permit the filter to enter the well and allow for adhesive between the filter 420 and sidewall 444.

One advantage of placing the filters in wells, compared with the prior art method of picking and placing bulk components and attaching them to a substrate is that the alignment of the reflecting and transmitting elements in the device 400 is achieved via the lithographic methods used to write the waveguides and create the filter wells, rather than relying on the accuracy of the pick-and-place machine used on assembling bulk components.

Figure 5:
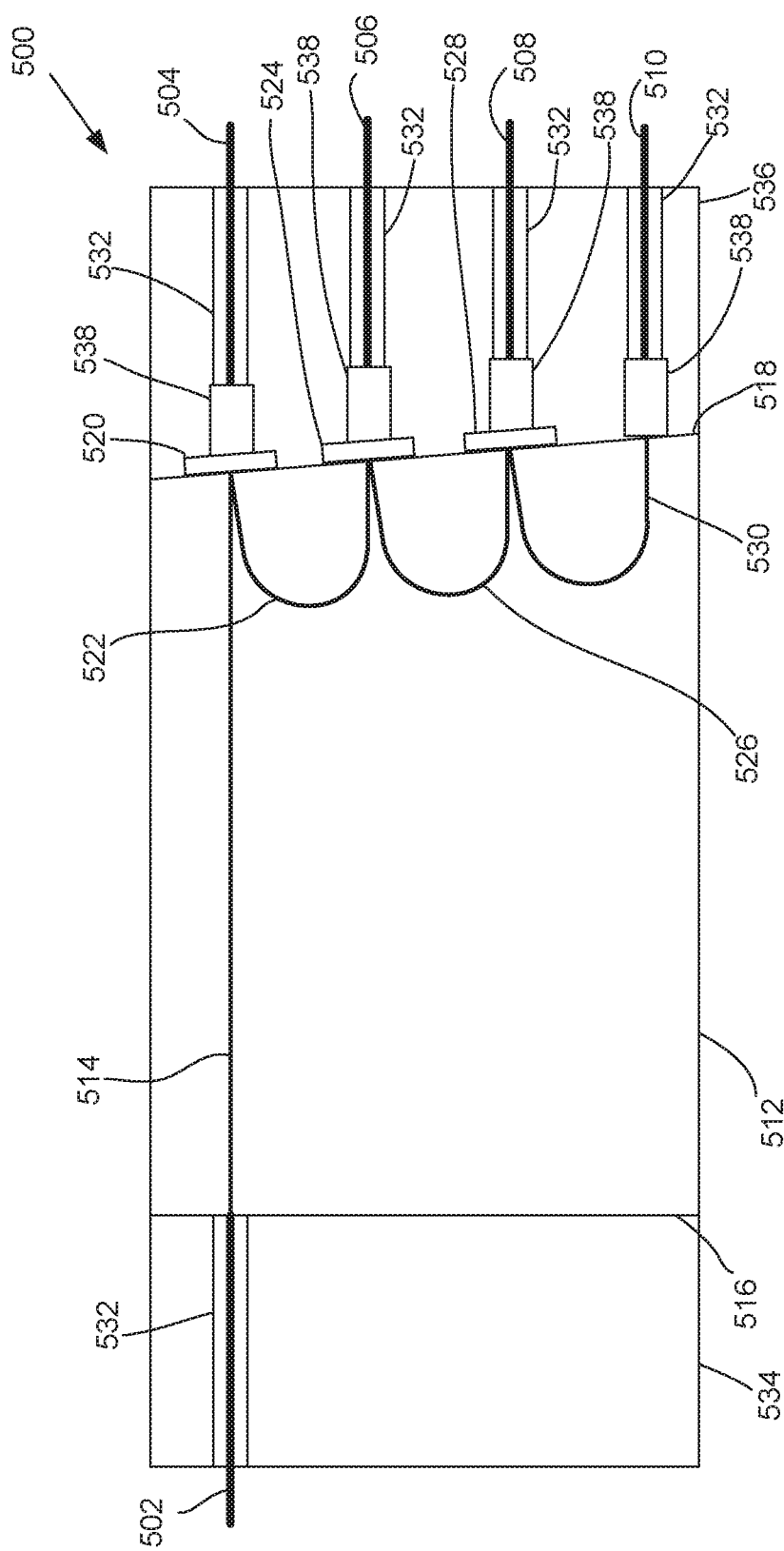
FIG. 5 schematically illustrates a top view of an integrated WDM mux/demux device having single channel fibers at one end, according to another embodiment of the present invention.

Another embodiment of integrated mux/demux device 500 is schematically illustrated in FIG. 5. In this device 500, the single channel fibers 504, 506, 508, 510 are all located at one end of the chip 512 opposite the end where the common fiber 502 is located. The device 500 includes an integrated chip 512 having a first waveguide 514 between a first chip face 516 and a second chip face 518. The common fiber 502 is aligned with the end of the first waveguide 514 at the first face 516 so that the combined optical signal passes along the first waveguide 514 towards the second face 518. In this embodiment, the combined optical signal includes components at $\lambda 1$, $\lambda 2$, $\lambda 3$ and $\lambda 4$, although the embodiment may be adapted to handle different numbers of channel components.

A first filter 520 is mounted at the end of the first waveguide 514 at the second face 518. The first filter 520 includes a multilayer dielectric coating on a substrate and transmits light at one of the wavelengths, for example the component $\lambda 1$, while reflecting the other wavelength components. The signal at $\lambda 1$ is transmitted through the filter 520 to the first single channel fiber 504. The reflected signal, containing the signals at $\lambda 2$, $\lambda 3$ and $\lambda 4$ is reflected along a second waveguide 522 that circles back to the second face 518. A second filter 524 is positioned at the end of the second waveguide 522 at the second face 518. The second filter 524 transmits one of the remaining optical signals, for example the optical signal at $\lambda 2$, and reflects the remaining signals at $\lambda 3$ and $\lambda 4$. The signal at $\lambda 2$ is transmitted through the second filter 524 to the second single channel fiber 506. The signal reflected at the second filter 524, containing signals at $\lambda 3$ and $\lambda 4$, is transmitted along the third waveguide 526 and circles back to the second face 518. A third filter 528 is positioned at the end of the third waveguide 526 at the second face 518. The third filter 528 transmits one of the remaining optical signals, for example the optical signal at $\lambda 3$, and reflects the remaining signal at $\lambda 4$. The signal at $\lambda 3$ is transmitted through the third filter 528 to the third single channel fiber 508. The signal at $\lambda 4$ is reflected by the third filter 528 along a fourth waveguide 530 that also circles back to the second face 518. The fourth single channel fiber 510 is located at the second face 518 to receive the optical signal at $\lambda 4$ from the fourth waveguide 530.

As discussed above, the optical chip 512 may be formed of any suitable material and the waveguides may be formed using the techniques discussed above. The different fibers, including the common fiber 502, and the single channel fibers 504, 506, 508, 510, may be single mode fibers or multimode fibers, depending on the optical system being used. Likewise, the waveguides 514, 522, 526, 530 may be single mode or multimode waveguides. The fibers 502, 504, 506, 508, 510 may be aligned to the respective waveguides in the chip 512 using any suitable method. In the illustrated embodiment, the fibers 502, 504, 506, 508, 510 are each contained within a respective alignment feature 532, such as a v-groove, on an alignment block 534, 536. The alignment blocks 534, 536 are illustrated as being integrally formed with the chip 512 and may be formed using any of the processes discussed above.

The device may include focusing elements 538, such as lenses, positioned to couple light between each of the single channel fibers 504, 506, 508 and 510 and their respective waveguides 514, 522, 526 and 530, although in some embodiments the lenses 538 may be omitted. Likewise, the common fiber 502 may also have a lens (not illustrated) for coupling between the common fiber and the first waveguide 514, but this may be omitted.

Thus, the device 500 has a first guided optical path for light at $\lambda 1$ between the common fiber 502 and the first single channel fiber 504, via the first waveguide 514, and a second optical path for light at $\lambda 2$ between the common fiber 502 and the second single channel fiber 506 via the first waveguide 514 and the second waveguide 522. The first filter 520 receives light from the common fiber 502. The first and second single channel fibers 504, 506 are at the same end of the chip 512, and the common fiber 502 is at the other end of the chip 512. The light at $\lambda 1$ is transmitted through the first filter 520 to the first single channel fiber 504 and the light at $\lambda 2$ is reflected by the first filter 520 towards the second single channel fiber 506.

Figure 6:
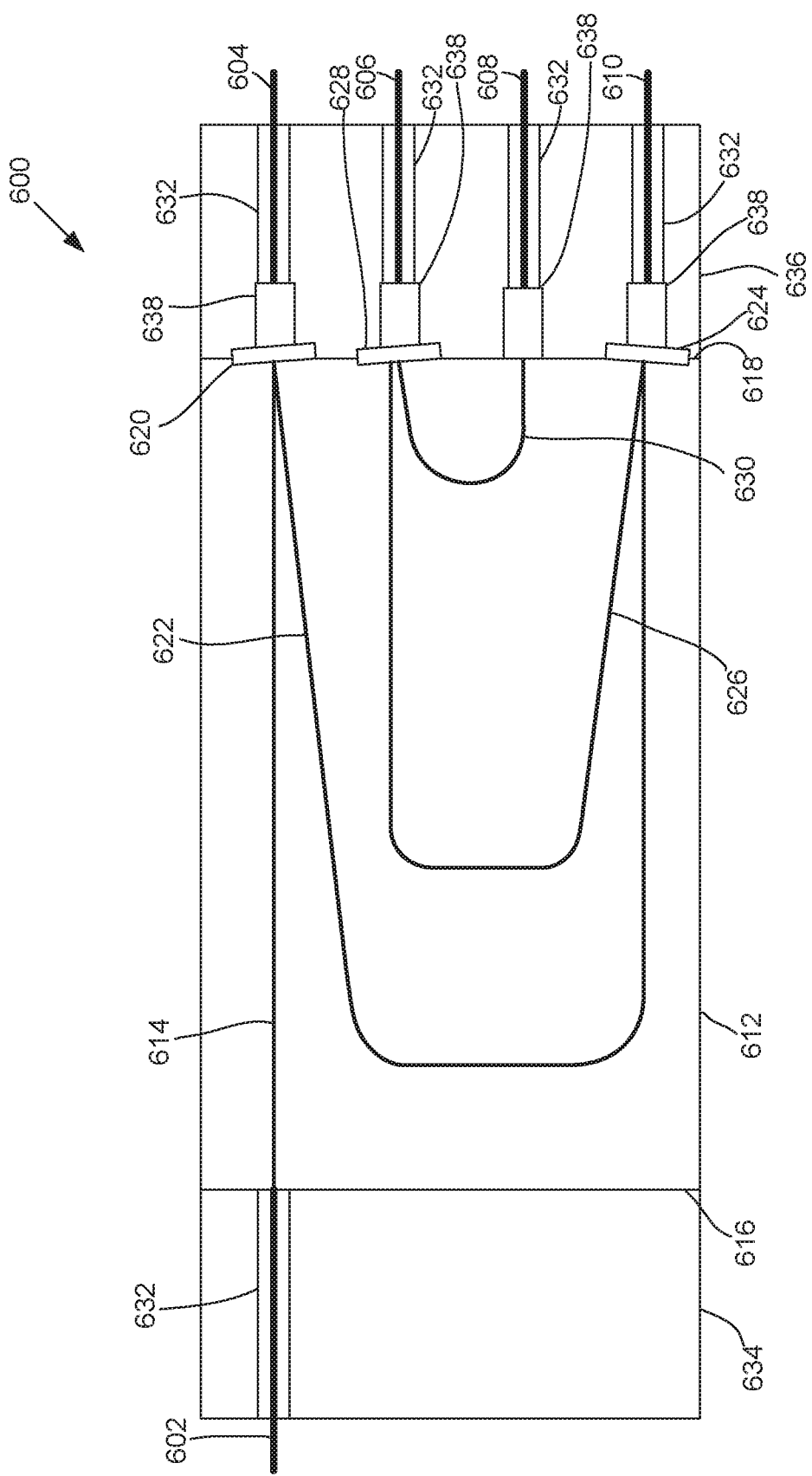
FIG. 6 schematically illustrates a top view of an integrated WDM mux/demux device having single channel fibers at one end of the optical chip, having the single channel fibers arranged differently from those in FIG. 5, according to another embodiment of the present invention.

Another embodiment of integrated mux/demux device 600 is schematically illustrated in FIG. 6. In this device 600, the single channel fibers 604, 606, 608, 610 are also located at one end of the chip 612 opposite the end where the common fiber 602 is located. The device 600 includes an integrated chip 612 having a first waveguide 614 between a first chip face 616 and a second chip face 618. The common fiber 602 is aligned with the end of the first waveguide 614 at the first face 616 so that the combined optical signal passes along the first waveguide 614 towards the second face 618. In this embodiment, the combined optical signal includes components at $\lambda 1$, $\lambda 2$, $\lambda 3$ and $\lambda 4$, although the embodiment may be adapted to handle different numbers of channel components.

A first filter 620 is mounted at the end of the first waveguide 614 at the second face 618. The first filter 620 includes a multilayer dielectric coating on a substrate and transmits light at one of the wavelengths, for example the component $\lambda 1$, while reflecting the other wavelength components. The signal at $\lambda 1$ is transmitted through the filter 620 to the first single channel fiber 604. The reflected signal, containing the signals at $\lambda 2$, $\lambda 3$ and $\lambda 4$ is reflected along a second waveguide 622 that circles back to the second face 618. In this embodiment, the second waveguide follows trajectory having a larger radius of curvature than the embodiment shown in FIG. 5, which may reduce transmission losses. A second filter 624 is positioned at the end of the second waveguide 622 at the second face 618. The second filter 624 transmits one of the remaining optical signals, for example the optical signal at $\lambda 2$, and reflects the remaining signals at $\lambda 3$ and $\lambda 4$. The signal at $\lambda 2$ is transmitted through the second filter 624 to the second single channel fiber 606. The signal reflected at the second filter 624, containing signals at $\lambda 3$ and $\lambda 4$, is transmitted along the third waveguide 626 and circles back to the second face 618. A third filter 628 is positioned at the end of the third waveguide 626 at the second face 618. The third filter 628 transmits one of the remaining optical signals, for example the optical signal at $\lambda 3$, and reflects the remaining signal at $\lambda 4$. The signal at $\lambda 3$ is transmitted through the third filter 628 to the third single channel fiber 606. The signal at $\lambda 4$ is reflected by the third filter 628 along a fourth waveguide 630 that also circles back to the second face 618. The fourth single channel fiber 610 is located at the second face 618 to receive the optical signal at $\lambda 4$ from the fourth waveguide 630.

As discussed above, the optical chip 612 may be formed of any suitable material and the waveguides may be formed using the techniques discussed above. The different fibers, including the common fiber 602, and the single channel fibers 604, 606, 608, 610, may be single mode fibers or multimode fibers, depending on the optical system being used. Likewise, the waveguides 614, 622, 626, 630 may be single mode or multimode waveguides. The fibers 602, 604, 606, 608, 610 may be aligned to the respective waveguides in the chip 612 using any suitable method. In the illustrated embodiment, the fibers 602, 604, 606, 608, 610 are each contained within a respective alignment feature 632, such as a v-groove, on an alignment block 634, 636. The alignment blocks 634, 636 are illustrated as being integrally formed with the chip 612 and may be formed using any of the processes discussed above.

The device may include focusing elements 638, such as lenses, positioned to couple light between each of the single channel fibers 604, 606, 608 and 610 and their respective waveguides 614, 622, 626 and 630, although in some embodiments the focusing elements 636 may be omitted. Likewise, the common fiber 602 may also have a focusing element (not illustrated) for coupling between the common fiber and the first waveguide 614, but this may be omitted.

In the illustrated embodiment, the filters 620, 624, 628 are attached on second face 618. In other embodiments, they may be inserted into wells within the chip 612, in a manner similar to that discussed above for the device shown in FIG. 4.

Thus, the device 600 has a first guided optical path for light at $\lambda 1$ between the common fiber 602 and the first single channel fiber 604, via the first waveguide 614, and a second optical path for light at $\lambda 2$ between the common fiber 602 and the second single channel fiber 606 via the first waveguide 614 and the second waveguide 622. The first filter 620 receives light from the common fiber 602. The first and second single channel fibers 604, 606 are at the same end of the chip 612, and the common fiber 602 is at the other end of the chip 512. The light at $\lambda 1$ is transmitted through the first filter 620 to the first single channel fiber 604 and the light at $\lambda 2$ is reflected by the first filter 620 towards the second single channel fiber 606.

Figure 7:
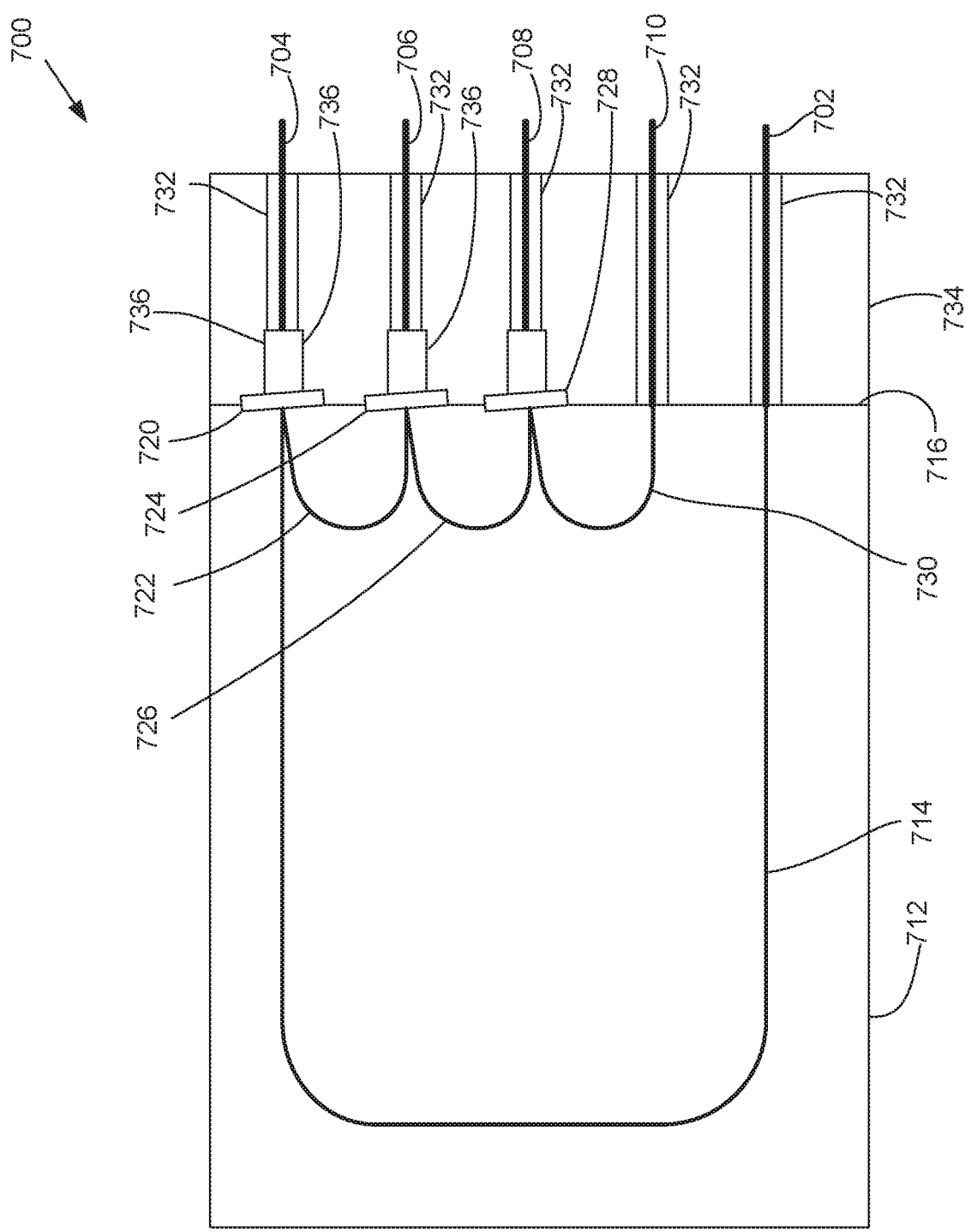
FIG. 7 schematically illustrates a top view of an integrated WDM mux/demux device having a common fiber and the single channel fibers at one end of the optical chip, according to another embodiment of the present invention.

Another embodiment of integrated mux/demux device 700 is schematically illustrated in FIG. 7. In this device 700, the common fiber 702 is located at the same end of the chip 712 as the single channel fibers 704, 706, 708, 710. The device 700 includes an integrated chip 612 having a first waveguide 714 that leads to different points on the first chip face 716. The common fiber 702 is aligned with the first end of the first waveguide 714 at the first face 716 so that the combined optical signal passes along the first waveguide 714. In this embodiment, the combined optical signal includes components at $\lambda 1$, $\lambda 2$, $\lambda 3$ and $\lambda 4$, although the device may be adapted to handle different numbers of channel components.

A first filter 720 is mounted at the second end of the first waveguide 714. The first filter 620 includes a multilayer dielectric coating on a substrate and transmits light at one of the wavelengths, for example the component $\lambda 1$, while reflecting the other wavelength components. The signal at $\lambda 1$ is transmitted through the filter 720 to the first single channel fiber 704. The reflected signal, containing the signals at $\lambda 2$, $\lambda 3$ and $\lambda 4$ is reflected along a second waveguide 722 that circles back to the first face 716. A second filter 724 is positioned at the end of the second waveguide 722 at the first face 716. The second filter 724 transmits one of the remaining optical signals, for example the optical signal at $\lambda 2$, and reflects the remaining signals at $\lambda 3$ and $\lambda 4$. The signal at $\lambda 2$ is transmitted through the second filter 724 to the second single channel fiber 706. The signal reflected at the second filter 724, containing signals at $\lambda 3$ and $\lambda 4$, is transmitted along the third waveguide 726 and circles back to the first face 716. A third filter 728 is positioned at the end of the third waveguide 726 at the first face 716. The third filter 728 transmits one of the remaining optical signals, for example the optical signal at $\lambda 3$, and reflects the remaining signal at $\lambda 4$. The signal at $\lambda 3$ is transmitted through the third filter 728 to the third single channel fiber 708. The signal at $\lambda 4$ is reflected by the third filter 728 along a fourth waveguide 730 that also circles back to the first face 718. The fourth single channel fiber 710 is located at the first face 718 to receive the optical signal at $\lambda 4$ from the fourth waveguide 730.

As discussed above, the optical chip 712 may be formed of any suitable material and the waveguides may be formed using the techniques discussed above. The different fibers, including the common fiber 702, and the single channel fibers 704, 706, 708, 710, may be single mode fibers or multimode fibers, depending on the optical system being used. Likewise, the waveguides 714, 722, 726, 730 may be single mode or multimode waveguides. The fibers 702, 704, 706, 708, 710 may be aligned to the respective waveguides in the chip 712 using any suitable method. In the illustrated embodiment, the fibers 702, 704, 706, 708, 710 are each contained within a respective alignment feature 732, such as a v-groove, on an alignment block 734. The alignment block 734 is illustrated as being integrally formed with the chip 712 and may be formed using any of the processes discussed above.

The device may include focusing elements 736, such as lenses, positioned to couple light between each of the single channel fibers 704, 706, 708 and 710 and their respective waveguides 714, 722, 726 and 730, although in some embodiments the focusing elements 736 may be omitted. Likewise, the common fiber 702 may also have a focusing element for coupling between the common fiber 702 and the first waveguide 714. However, the first waveguide 714 and common fiber 702 may both be perpendicular to the first face 716, a configuration in which the need for a coupling lens is reduced.

In the illustrated embodiment, the filters 720, 724, 728 are attached on the first face 716. In other embodiments, one or more of the filters 720, 724, 728 may be inserted into wells within the chip 712, in a manner similar to that discussed above for the device shown in FIG. 4.

Thus, the device 700 has a first guided optical path for light at $\lambda 1$ between the common fiber 702 and the first single channel fiber 704, via the first waveguide 714, and a second optical path for light at $\lambda 2$ between the common fiber 702 and the second single channel fiber 706 via the first waveguide 714 and the second waveguide 722. The first filter 720 receives light from the common fiber 702. The common fiber 702 and the first and second single channel fibers 704, 706 are at the same end of the chip 712. The light at $\lambda 1$ is transmitted through the first filter 720 to the first single channel fiber 704 and the light at $\lambda 2$ is reflected by the first filter 720 towards the second single channel fiber 706.

Another embodiment of an integrated mux/demux device 1000 is schematically illustrated in FIG. 10. In this device 1000, the common fiber 1002 and the single channel fibers 1004, 1006, 1008, 1010 are all located at one end of the chip 1012. The device 1000 includes an integrated chip 1012 having a first waveguide 1014 between a first chip face 1016 and a second chip face 1018. The common fiber 1002 is aligned with the end of the first waveguide 1014 at the first face 1016 so that the combined optical signal from the common fiber 1002 passes along the first waveguide 1014 towards the second face 1018. In this embodiment, the combined optical signal includes components at $\lambda 1$, $\lambda 2$, $\lambda 3$ and $\lambda 4$, although the embodiment may be adapted to handle different numbers of channel components. The second face 1018 is reflective at the wavelengths of the combined signal from the common fiber. For example, the second face 1018 may be provided with a reflective coating, or may have one or more reflecting elements attached to it where the waveguides are incident at the second face 1018.

The common signal from the common fiber 1002 passes along the first waveguide 1014 to the second face 1018, where the common signal is reflected into a second waveguide 1020. The signal then propagates along the second waveguide 1020 towards the first face 1016, and is incident at a first filter 1022. The first filter 1022 is wavelength selective and may include a multilayer dielectric coating on a substrate that transmits light at one of the wavelengths, for example the component $\lambda 1$, while reflecting the other wavelength components. The first filter 1022 may be disposed within a well in the optical chip 1012. The signal at $\lambda 1$ is transmitted through the first filter 1022 and along the second waveguide 1020 to the first single channel fiber 1004.

The signal reflected by the first filter 1022, containing the signals at $\lambda 2$, $\lambda 3$ and $\lambda 4$ propagates along a third waveguide 1024 to the second face 1018, where it is reflected along a fourth waveguide 1026 back towards the first face 1016. A second filter 1028 is positioned across the fourth waveguide 1026. The second filter 1028 transmits one of the remaining optical signals, for example the optical signal at $\lambda 2$, and reflects the remaining signals at $\lambda 3$ and $\lambda 4$. The signal at $\lambda 2$ is transmitted through the second filter 1028 to the second single channel fiber 1006.

The signal reflected at the second filter 1028, containing signals at $\lambda 3$ and $\lambda 4$, is transmitted along a fifth waveguide 1030 to the second face 1018 where it is reflected along a sixth waveguide 1032 back towards the first face 1016. A third filter 1034 is positioned across the sixth waveguide 1032. The third filter 1034 transmits one of the remaining optical signals, for example the optical signal at $\lambda 3$, and reflects the remaining signal at $\lambda 4$. The signal at $\lambda 3$ is transmitted through the third filter 1034 to the third single channel fiber 1008. The signal at $\lambda 4$ is transmitted along a seventh waveguide 1036 to the second face, where it is reflected along an eighth waveguide 1038 to the fourth single channel fiber 1010.

Thus, the device 1000 has a first guided optical path for light at $\lambda 1$ between the common fiber 1002 and the first single channel fiber 1004, via the first and second waveguides 1014, 1020, and a second optical path for light at $\lambda 2$ between the common fiber 1002 and the second single channel fiber 1006 via the first, second, third and fourth waveguides 1014, 1020, 1024, 1026. The first filter 1022 receives light from the common fiber 1002. The first and second single channel fibers 1004, 1006 are at the same end of the chip 1012, along with the common fiber 1002. The light at $\lambda 1$ is transmitted through the first filter 1022 to the first single channel fiber 504 and the light at $\lambda 2$ is reflected by the first filter 1022 along the second optical path to the second single channel fiber 1006.

Figure 11:
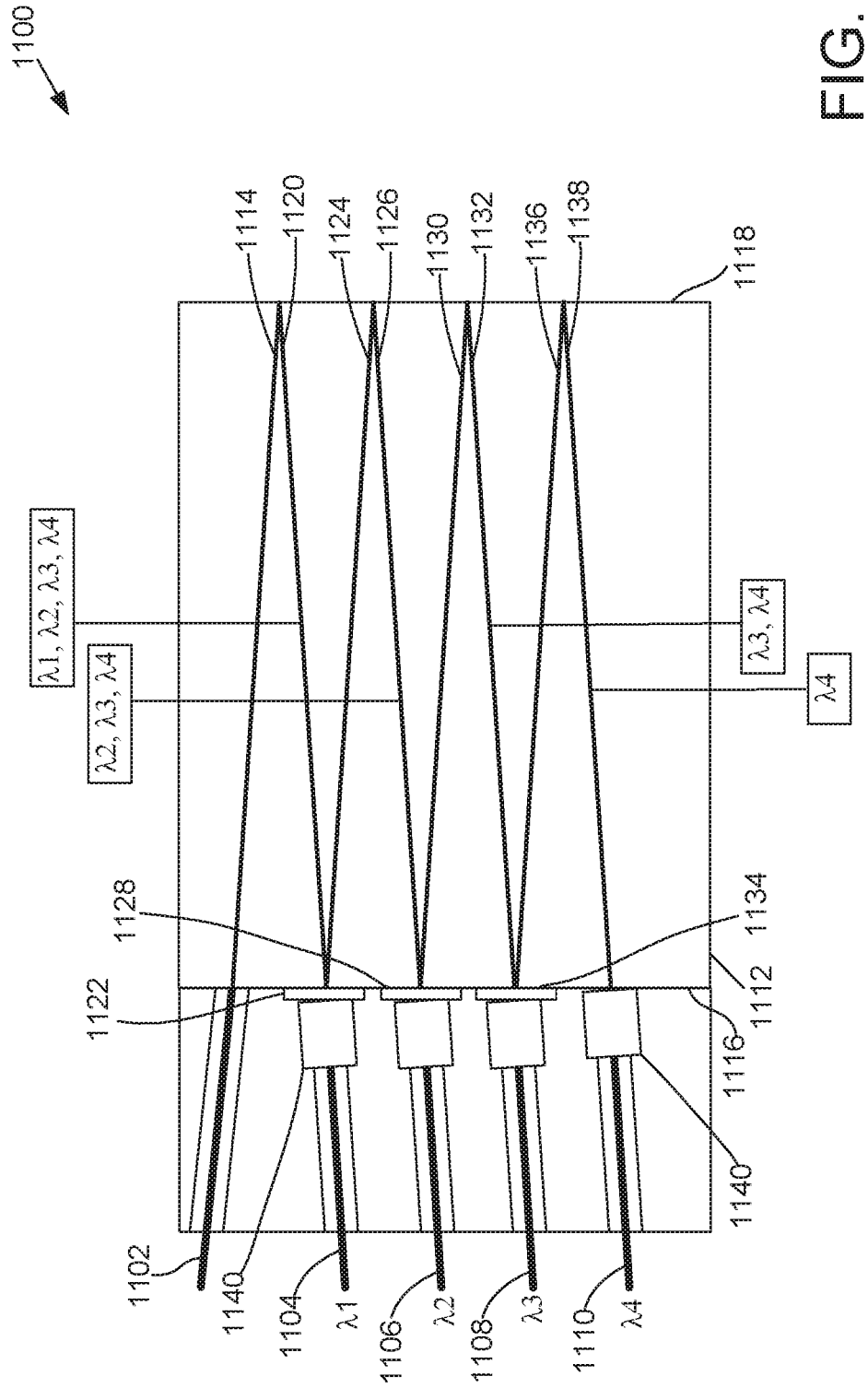
FIG. 11 schematically illustrates a top view of an integrated WDM mux/demux device having a common fiber and the single channel fibers at one end of the optical chip, according to another embodiment of the present invention.

Another embodiment of an integrated mux/demux device 1100 is schematically illustrated in FIG. 11. This device 1100 has some similarities to the device 1000, but it includes filters mounted outside the chip and focusing elements, such as lenses to couple light between the single channel fibers and their respective waveguides. The common fiber 1102 and the single channel fibers 1104, 1106, 1108, 1110 are all located at one end of the chip 1112. The device 1100 includes an integrated chip 1112 having a first waveguide 1114 between a first chip face 1116 and a second chip face 1118. The common fiber 1102 is aligned with the end of the first waveguide 1114 at the first face 1116 so that the combined optical signal from the common fiber 1102 passes along the first waveguide 1114 towards the second face 1118. In this embodiment, the combined optical signal includes components at $\lambda 1$, $\lambda 2$, $\lambda 3$ and $\lambda 4$, although the embodiment may be adapted to handle different numbers of channel components. The second face 1118 is reflective at the wavelengths of the combined signal from the common fiber. For example, the second face 1118 may be provided with a reflective coating, or may have one or more reflecting elements attached to it where the waveguides are incident at the second face 1118.

The common signal from the common fiber 1102 passes along the first waveguide 1014 to the second face 1018, where the common signal is reflected into a second waveguide 1020. The signal then propagates along the second waveguide 1020 towards the first face 1016, and is incident at a first filter 1122. The first filter 1122 is wavelength selective and may include a multilayer dielectric coating on a substrate that transmits light at one of the wavelengths, for example the component $\lambda 1$, while reflecting the other wavelength components. The first filter 1122 is mounted at the first face 1116. The signal at $\lambda 1$ is transmitted through the first filter 1122 to the first single channel fiber 1104.

The signal reflected by the first filter 1122, containing the signals at $\lambda 2$, $\lambda 3$ and $\lambda 4$ propagates along a third waveguide 1124 to the second face 1118, where it is reflected along a fourth waveguide 1126 back towards the first face 1116. A second filter 1128 is positioned across the fourth waveguide 1126. The second filter 1128 transmits one of the remaining optical signals, for example the optical signal at $\lambda 2$, and reflects the remaining signals at $\lambda 3$ and $\lambda 4$. The signal at $\lambda 2$ is transmitted through the second filter 1128 to the second single channel fiber 1106.

The signal reflected at the second filter 1128, containing signals at $\lambda 3$ and $\lambda 4$, is transmitted along a fifth waveguide 1130 to the second face 1118 where it is reflected along a sixth waveguide 1132 back towards the first face 1116. A third filter 1134 is positioned across the sixth waveguide 1132. The third filter 1134 transmits one of the remaining optical signals, for example the optical signal at $\lambda 3$, and reflects the remaining signal at $\lambda 4$. The signal at $\lambda 3$ is transmitted through the third filter 1134 to the third single channel fiber 1108. The signal at $\lambda 4$ is transmitted along a seventh waveguide 1136 to the second face, where it is reflected along an eighth waveguide 1138 to the fourth single channel fiber 1110.

The device may include focusing elements 1140, such as lenses, positioned to couple light between each of the single channel fibers 1104, 1106, 1108 and 1110 and their respective waveguides 1120, 1126, 1132 and 1138, although in some embodiments the lenses 1040 may be omitted. Likewise, the common fiber 1102 may also have a lens (not illustrated) for coupling between the common fiber 1102 and the first waveguide 1114, but this may be omitted.

Figure 12:
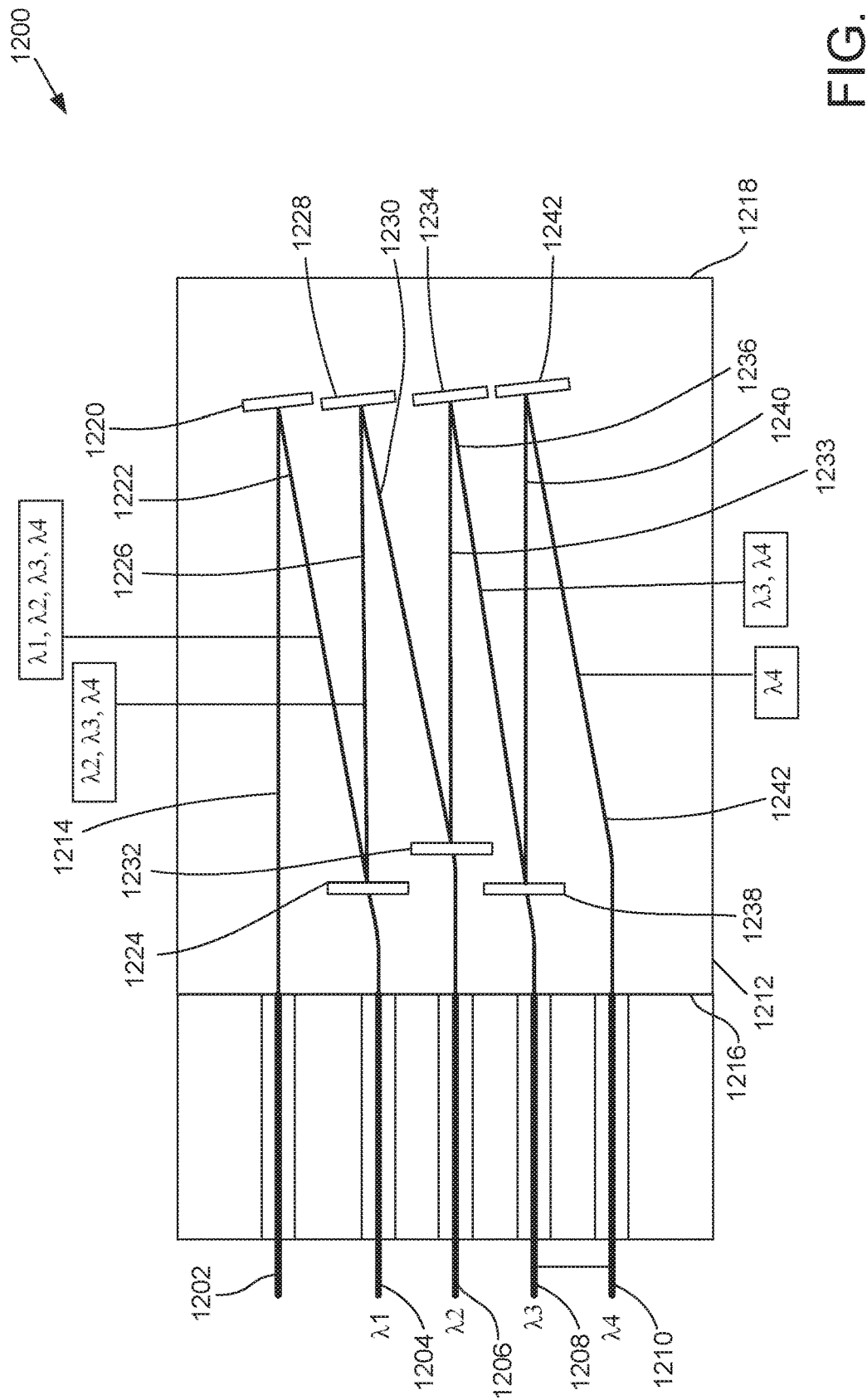
FIG. 12 schematically illustrates a top view of an integrated WDM mux/demux device having a common fiber and the single channel fibers at one end of the optical chip, according to another embodiment of the present invention.

Another embodiment of an integrated mux/demux device 1200 is schematically illustrated in FIG. 12. This device 1200 has some similarities to the device 1000, but it includes reflecting elements mounted on the chip, rather than relying on reflection from the end of the chip. The common fiber 1202 and the single channel fibers 1204, 1206, 1208, 1210 are all located at one end of the chip 1212. The device 1200 includes an integrated chip 1212 having a first waveguide 1214 between a first chip face 1216 and a second chip face 1218. The common fiber 1202 is aligned with the end of the first waveguide 1214 at the first face 1216 so that the combined optical signal from the common fiber 1202 passes along the first waveguide 1214 towards the second face 1218. In this embodiment, the combined optical signal includes components at $\lambda 1$, $\lambda 2$, $\lambda 3$ and $\lambda 4$, although the embodiment may be adapted to handle different numbers of channel components. A first broadband reflector 1220 is disposed at the end of the first waveguide 1214 to reflect the combined optical signal back towards the first face 1216. In this context, the term "broadband" means that the reflector reflects substantially all the light in each of the optical wavelength channels incident thereon. Thus, the reflector 1220 reflects the signals at λ1, λ2, λ3 and λ4. The reflector 1220 may be included within a well across the first waveguide 1214, in a manner like that discussed above.

After reflection at the reflector 1220, the signal propagates along the second waveguide 1222 towards the first face 1216, and is incident at a first filter 1224 that sits across the second waveguide 1222. The first filter 1224 is wavelength selective and may include a multilayer dielectric coating on a substrate that transmits light at one of the wavelengths, for example the component λ1, while reflecting the other wavelength components. The first filter 1224 may be mounted within a well across the second waveguide 1222, in a manner like that discussed above. The signal at λ1 is transmitted through the first filter 1224 to the first single channel fiber 1204.

The signal reflected by the first filter 1224, containing the signals at λ2, λ3 and λ4 propagates along a third waveguide 1226 towards second face 1218. A second broadband reflector 1228 is disposed at the end of the third waveguide 1226, to reflect the incident light along a fourth waveguide 1230, towards the first face 1216. A second filter 1232 is positioned across the fourth waveguide 1230. The second filter 1232 transmits one of the remaining optical signals, for example the optical signal at λ2, and reflects the remaining signals at λ3 and λ4. The signal at λ2 is transmitted through the second filter 1232 to the second single channel fiber 1206.

The signal reflected at the second filter 1232, containing signals at λ3 and λ4, is transmitted along a fifth waveguide 1233 towards the second face 1218. A third broadband reflector 1234 is disposed at the end of the fifth waveguide 1233, to reflect the incident light along a sixth waveguide 1236, towards the first face 1216. A third filter 1238 is positioned across the sixth waveguide 1236. The third filter 1238 transmits one of the remaining optical signals, for example the optical signal at λ3, and reflects the remaining signal at λ4. The signal at λ3 is transmitted through the third filter 1238 to the third single channel fiber 1208. The third filter may be positioned within a well across the sixth waveguide, in a manner like that discussed above.

The light reflected by the third filter 1238 is directed along a seventh waveguide 1240 and is reflected by a fourth broadband reflector 1242 along an eighth waveguide 1242 to the fourth single channel fiber 1210.

The device may include focusing elements, such as lenses, positioned to couple light between each of the single channel fibers 1204, 1206, 1208 and 1210 and their respective waveguides 1122, 1230, 1236, 1242, although in some embodiments the lenses may be omitted. Likewise, there may also be a focusing element for coupling light between the common fiber 1202 and the first waveguide 1214.

Figure 13:
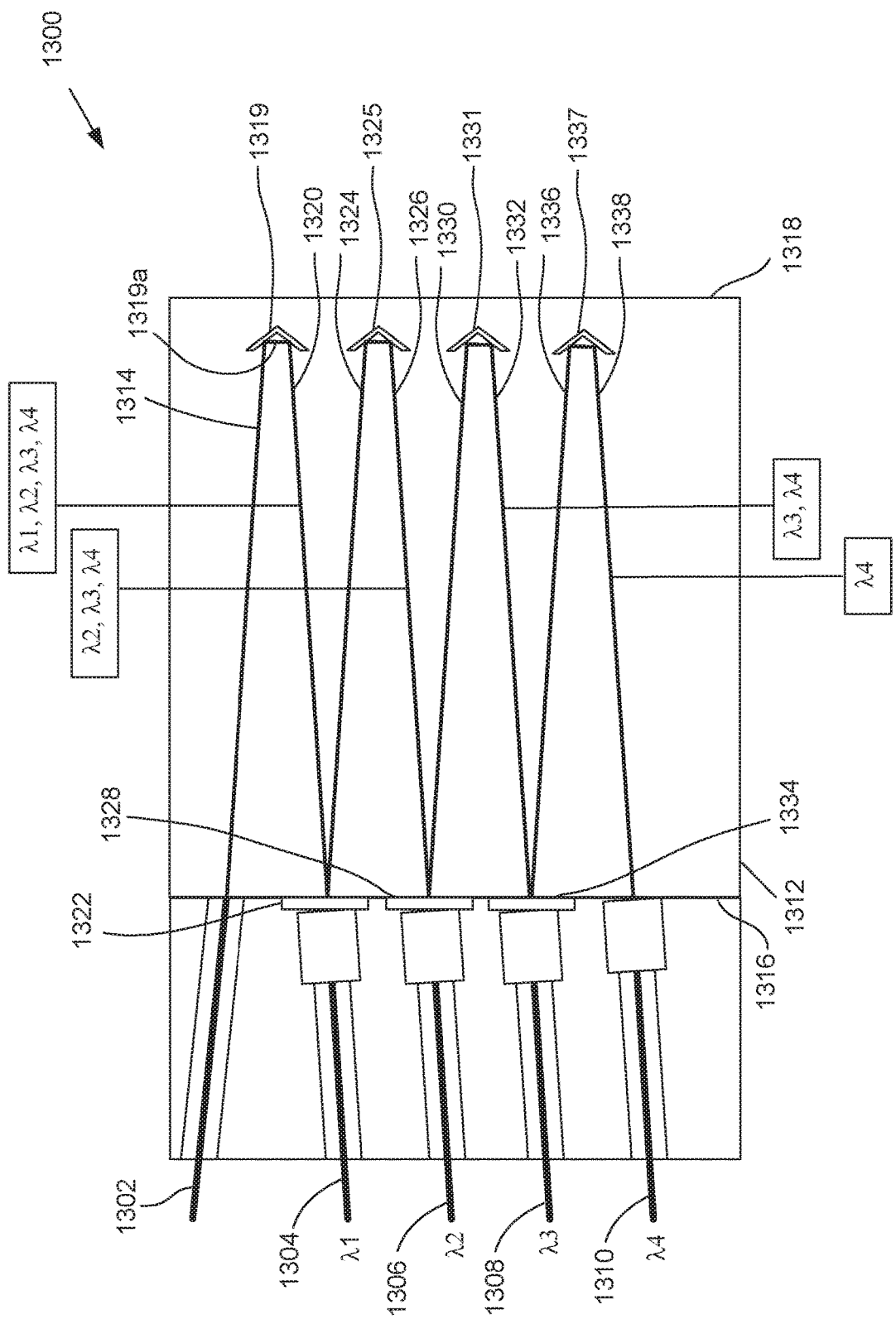
FIG. 13 schematically illustrates a top view of an integrated WDM mux/demux device having a common fiber and the single channel fibers at one end of the optical chip, according to another embodiment of the present invention.

Another embodiment of an integrated mux/demux device 1300 is schematically illustrated in FIG. 13. This device 1300 has some similarities to the device 1100, but it includes totally internally reflecting well features on the chip, instead of relying on the end face of the chip for reflection. The common fiber 1302 and the single channel fibers 1304, 1306, 1308, 1310 are all located at one end of the chip 1312. The device 1300 includes an integrated chip 1312 having a first waveguide 1314 stretching between at least part of the distance between the first chip face 1316 and the second chip face 1318. The common fiber 1302 is aligned with the end of the first waveguide 1314 at the first face 1316 so that the combined optical signal from the common fiber 1302 passes along the first waveguide 1314 towards the second face 1318. In this embodiment, the combined optical signal includes components at λ1, λ2, λ3 and λ4, although the embodiment may be adapted to handle different numbers of channel components. A first reflecting well 1319 is disposed at the end of the first waveguide 1314. The first reflecting well 1319 may be formed with a v-shape. The first reflective well 1319 is empty, so that light incident at a wall of the first arm of the v-shaped well 1319 is total internally reflected within the chip 1312 through a short waveguide 1319a and internally reflected again at a wall of the second arm of the v-shaped well 1319 along a second waveguide 1320 towards the first face 1316. The common signal is incident on the first filter 1322 at the end of the second waveguide The first filter 1322 is wavelength selective and may include a multilayer dielectric coating on a substrate that transmits light at one of the wavelengths, for example the component λ1, while reflecting the other wavelength components. The first filter 1322 is mounted at the first face 1316. The signal at λ1 is transmitted through the first filter 1322 to the first single channel fiber 1304.

The signal reflected by the first filter 1322, containing the signals at λ2, λ3 and λ4 propagates along a third waveguide 1324 to a second reflective well 1325, which may be a v-shaped well. The second reflective well 1325 reflects the light along a fourth waveguide 1326 back towards the first face 1316. A second filter 1328 is positioned across the fourth waveguide 1326. The second filter 1328 transmits one of the remaining optical signals, for example the optical signal at λ2, and reflects the remaining signals at λ3 and λ4. The signal at λ2 is transmitted through the second filter 1328 to the second single channel fiber 1306.

The signal reflected at the second filter 1328, containing signals at λ3 and λ4, is transmitted along a fifth waveguide 1330 to a third reflecting well 1331 which directs the light along a sixth waveguide 1332 back towards the first face 1316. A third filter 1334 is positioned across the sixth waveguide 1332. The third filter 1334 transmits one of the remaining optical signals, for example the optical signal at λ3, and reflects the remaining signal at λ4. The signal at λ3 is transmitted through the third filter 1334 to the third single channel fiber 1308. The signal at λ4 is transmitted along a seventh waveguide 1336 to a fourth reflecting well 1337, where it is reflected along an eighth waveguide 1338 to the fourth single channel fiber 1310.

The device may include focusing elements, such as lenses, positioned to couple light between each of the single channel fibers 1304, 1306, 1308 and 1310 and their respective waveguides 1320, 1326, 1332 and 1338, although in some embodiments the lenses 1340 may be omitted. Likewise, the common fiber 1302 may also be provided with a focusing element for coupling to the first waveguide 1314.

Figure 8A:
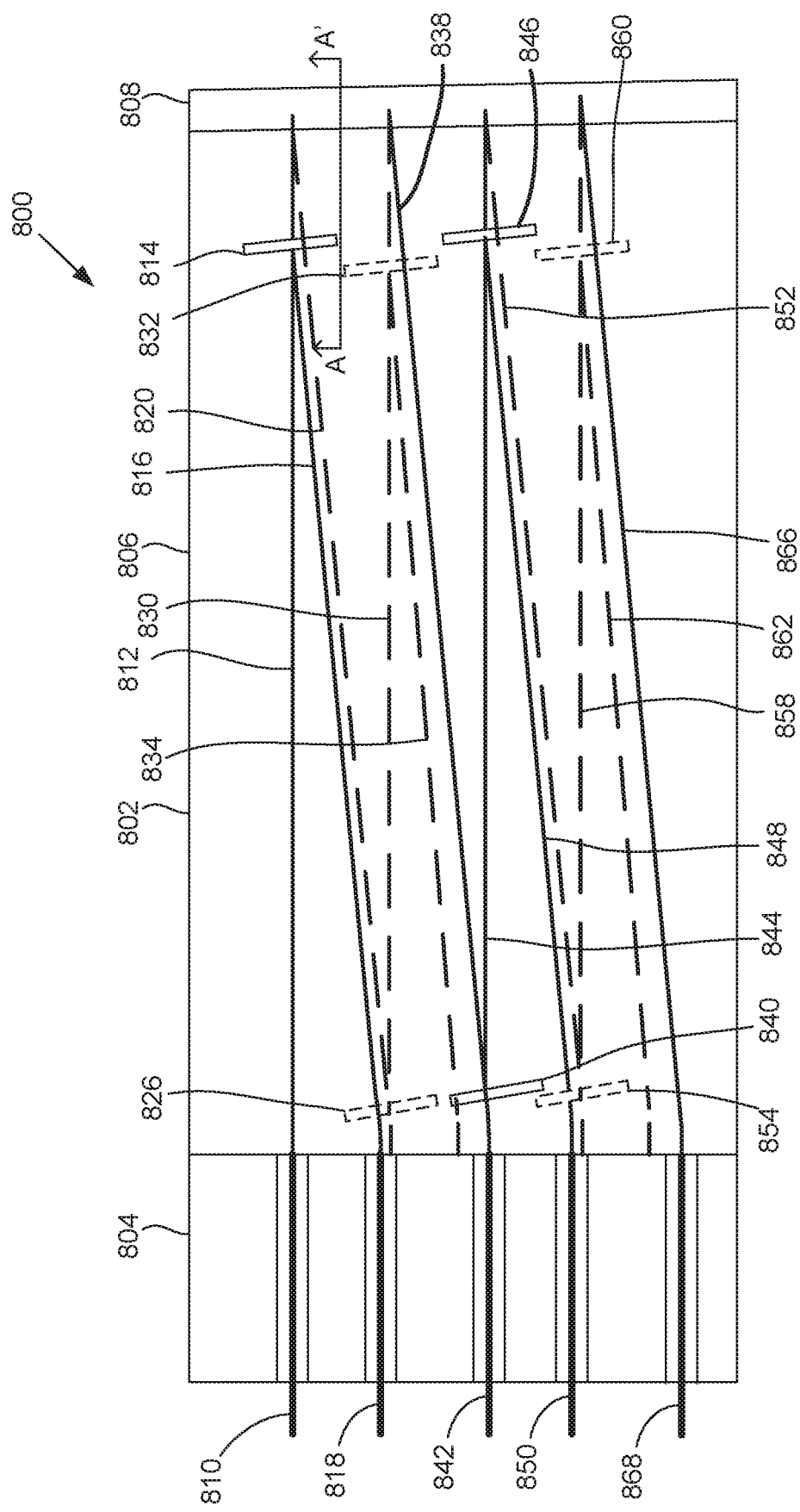
FIGS. 8A and 8B schematically illustrate respective top and bottom views of an integrated WDM mux/demux device having a common fiber and the single channel fibers at one end of the optical chip that incorporates a retroreflecting portion at an opposite end of the chip, according to another embodiment of the present invention.
Figure 8B:
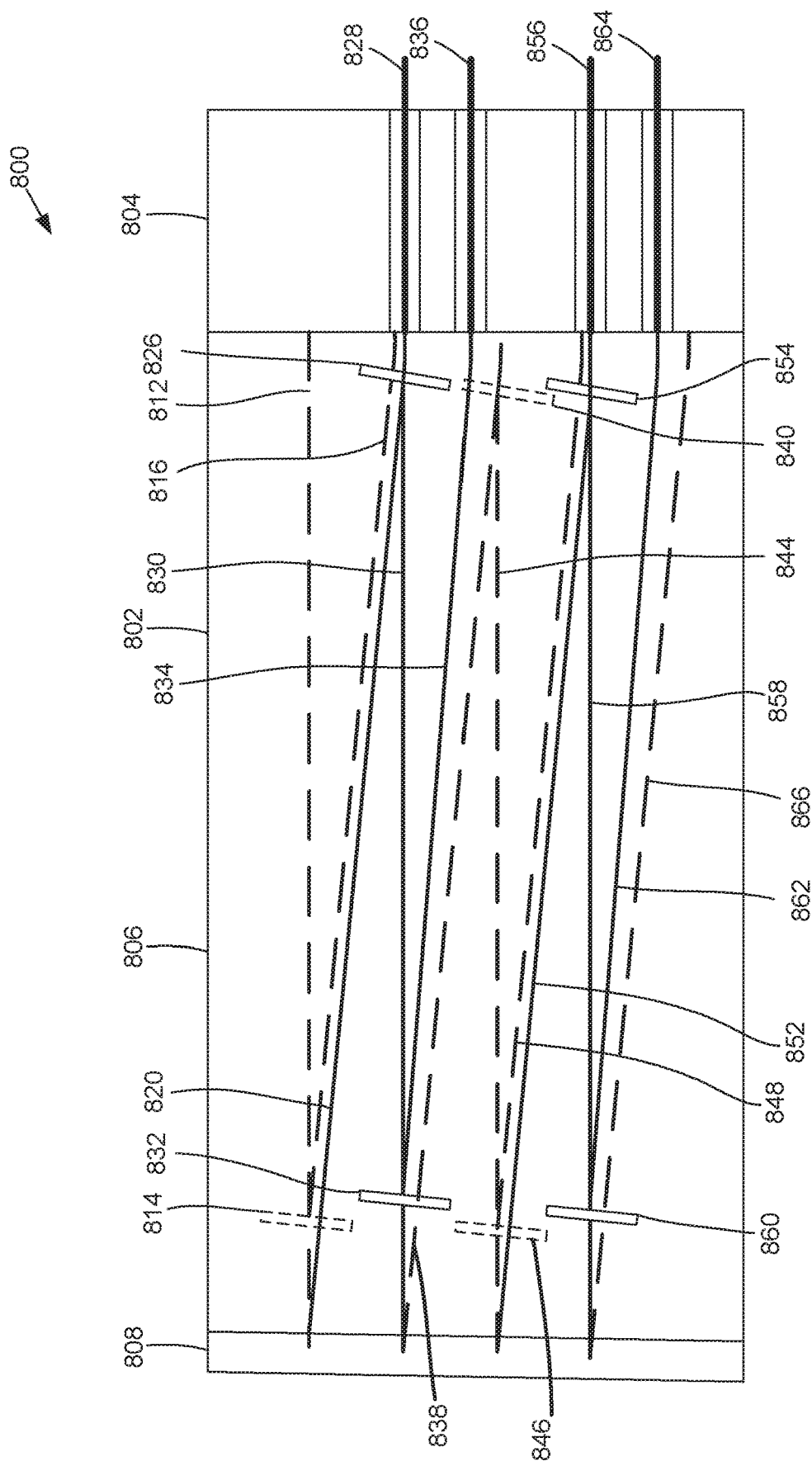
Figure 8D:
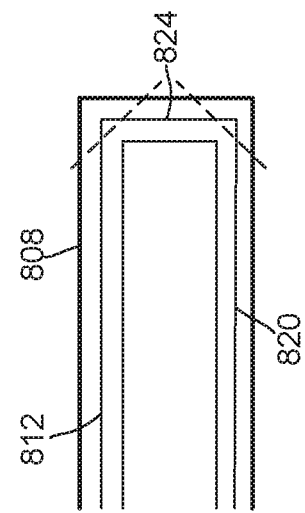
FIG. 8D schematically illustrates a process for forming the retroreflecting portion of the chip in a WDM mux/demux device, according to an embodiment of the present invention.

Another embodiment of integrated mux/demux device 800 is schematically illustrated in FIGS. 8A and 8B. FIG. 8A shows a schematic view from above the device 800 while FIG. 8B shows a schematic view from below the device 800. The optical chip 802, about which the device is based, includes an input/output (i/o) portion 804, a waveguide portion 806 and a retroreflecting portion 808. In the illustrated embodiment, a common fiber 810 is located on the upper side of the i/o portion 804, and is aligned with a first upper waveguide 812 in the waveguide section. The light signal from the common fiber 810 may contain components at different wavelengths. In the illustrated embodiment, the device can multiplex/demultiplex signals at up to eight different wavelengths, λ1, λ2, λ3, λ4, λ5, λ6, λ7 and λ8, although it will be understood that the device may be modified to process signals at different numbers of wavelengths. The combined light signal from the common fiber 810 propagates along the first upper waveguide 812 to a first upper filter 814, which reflects light at one of the wavelengths, for example λ1, and transmits the other wavelength components, λ2, λ3, λ4, λ5, λ6, λ7 and λ8. The first filter 814 may be included in a well within the chip, in a manner like that discussed above. The light signal reflected by the first upper filter 814 is directed along a second upper waveguide 816 which couples to a first single channel fiber 818.

Figure 8C:
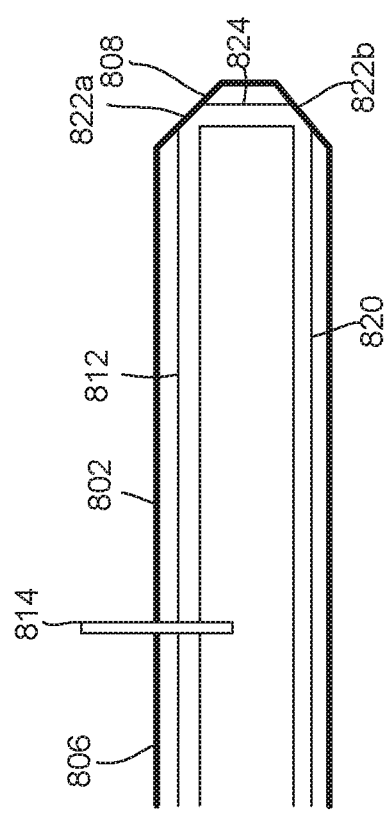
FIG. 8C schematically illustrates waveguides at the retroreflecting portion of the chip in a WDM mux/demux device, according to an embodiment of the present invention.

The light that is transmitted through the first upper filter 814 continues along the first upper waveguide 812 to the retroreflector section 808, where it is reflected from the first upper waveguide to the first lower waveguide 820. A cross-sectional view AA' through the chip 802 in the region of the retroreflecting portion 808 is schematically illustrated in FIG. 8C, showing the first upper waveguide 812. The retroreflecting portion 808 includes two reflecting surfaces 822a, 822b that are disposed at an angle relative to each other, preferably around 90°. Light propagating along the first upper waveguide 812 is reflected by the two reflecting surfaces 822a, 822b into the first lower waveguide 820. The first upper and lower waveguides 812, 820 are coupled via a short section of vertical waveguide 824 between the two reflecting surfaces 822a, 822b. Thus, light that propagates along the first upper waveguide 812 towards the retroreflecting portion is reflected along the first lower waveguide 820 away from the retroreflecting portion. The first upper filter 814 is set at a depth that crosses the first upper waveguide 812, but not the first lower waveguide 820. The reflecting surfaces 822a, 822b may be totally internally reflecting surfaces, or may be coated reflecting surfaces. In this embodiment, the reflecting surfaces 822a, 822b of the retroreflecting portion 808 are oriented so the first upper waveguide 812 is not parallel to the first lower waveguide 820 when viewed from either above (e.g. as shown in FIG. 8A) or below (e.g. as shown in FIG. 8B), although in other embodiments they may be parallel.

An approach to forming the retroreflecting portion 808 of the chip 802 is schematically illustrated with reference to FIG. 8C. The retroreflecting section 808 may first be formed with a rectangular end, as shown, with the first upper, first lower and short vertical waveguides written in the chip substrate material using one or more of the waveguide forming process discussed above. The corners of the retroreflecting portion 808 may then be polished, for example at the dotted lines, to form the reflecting surfaces 822a, 822b. If desired, the reflecting surfaces 822a, 822b may then be coated with a reflective coating.

Thus, it will be understood that the chip 802 includes a number of waveguides that are closer to the upper surface of the optical chip 802 and a number of waveguides that are closer to its lower surface. In FIG. 8A, which shows a view of the upper surface, the upper waveguides and filters disposed in wells in the upper surface are drawn with solid lines, whereas the lower waveguides and filters are drawn in dashed line. The fibers that couple to the upper waveguides are shown in FIG. 8A, while those that couple to the lower waveguides are not shown. On the other hand, in FIG. 8B, which shows a view of the lower surface, the lower waveguides and filters disposed in wells in the lower surface are drawn with solid lines, whereas the upper waveguides and filters are drawn in dashed line. The fibers that couple to the lower waveguides are shown in FIG. 8B, while those that couple to the upper waveguides are not shown.

Light that passes along the first lower waveguide 820 from the retroreflecting portion 808 is incident at the first lower filter 826. The first lower filter 826 transmits at one of the incident wavelengths, for example λ2, and reflects the light at the remaining wavelengths, e.g. λ3, λ4, λ5, λ6, λ7 and λ8. The signal at λ2 transmitted through the first lower filter 826 is coupled from the first lower waveguide 820 to a second single channel fiber 828.

The light reflected by the first lower filter 826 propagates along the second lower waveguide 830 towards the retroreflecting portion 808. Before reaching the retroreflecting portion 808, the light is incident at a second lower filter 832 that crosses the second lower waveguide 830. The second lower filter 832 reflects light at one of the incident wavelengths, for example λ3, and transmits the light at the remaining wavelengths, e.g. λ4, λ5, λ6, λ7 and λ8. The signal at λ3 reflected by the second lower filter 832 is reflected along a third lower waveguide 834 towards the i/o portion 804, and is coupled into a third single channel fiber 836.

The light transmitted by the second lower filter 832 propagates along the second lower waveguide 830 to the retroreflecting portion 808, where it is coupled to a third upper waveguide 838. The remaining optical signal propagates along the third upper waveguide 838 towards the i/o portion 804 and is incident on a second upper filter 840, which transmits light at one of the incident wavelengths, for example, λ4, and reflects signals at the other wavelengths, e.g. λ5, λ6, λ7 and λ8. The light at λ4 that is transmitted by the second upper filter 840 propagates further along the third upper waveguide 838 and is coupled to the fourth single channel fiber 842.

The light reflected by the third upper filter 840 propagates along a fourth upper waveguide 844 towards the retroreflecting portion 808. Before reaching the retroreflecting portion 808, the light is incident at a third upper filter 846, which reflects light at one of the incident wavelengths, for example λ5, and transmits the signals at the other wavelengths, e.g., λ6, λ7 and λ8. The light reflected by the third upper filter 846 is reflected along a fifth upper waveguide 848 towards the i/o portion where it is coupled to a fifth single channel fiber 850.

The light transmitted by the third upper filter 846 propagates along the remainder of the fourth upper waveguide 844 to the retroreflecting portion 808, where it is coupled to a fourth lower waveguide 852 and then propagates back towards the i/o portion 804. Close to the i/o portion 804 the light is incident on a third lower filter 854, which transmits light at one of the incident wavelengths, for example λ6, and reflects the signals at the other wavelengths, e.g. λ7 and λ8. The light at λ6 transmitted by the third lower filter 854 continues to propagate along the fourth lower waveguide 852 to the i/o portion 804, where it is coupled into a sixth single channel fiber 856.

The light reflected by the third lower filter 854 propagates along a fifth lower waveguide 858 back towards the retroreflecting portion 808. The light is incident on a fourth lower filter 860 which is across the fifth lower waveguide 858. The fourth lower filter 860 reflects light at one of the incident wavelengths, for example the light at λ7, and transmits light at the other wavelength, e.g. λ8. The light reflected by the fourth lower filter 860 is directed along a sixth lower waveguide 862 back towards the i/o portion 804, where it couples to a seventh single channel fiber 864.

The light at λ8 transmitted by the fourth lower filter 860 propagates along the fifth lower waveguide 858 to the retroreflecting portion 808, where it is coupled to a sixth upper waveguide 866. The light then propagates along the sixth upper waveguide 866 towards the i/o portion 804, where it is coupled into an eighth single channel fiber 868.

Figure 8F:
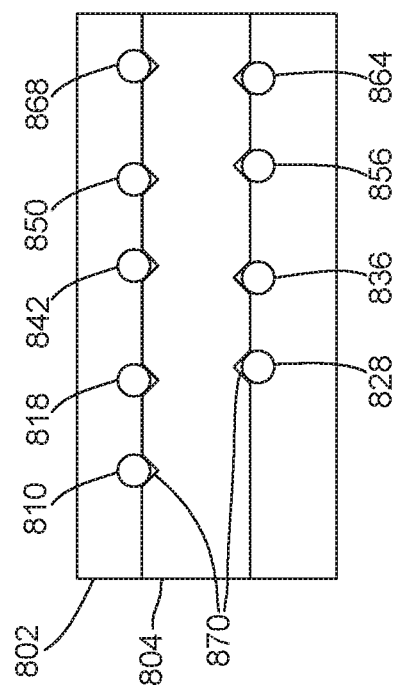
FIGS. 8E and 8F schematically illustrate respective side and end views of the input/output portion of the WDM mux/demux device of FIGS. 8A and 8B, according to an embodiment of the present invention.
Figure 8E:
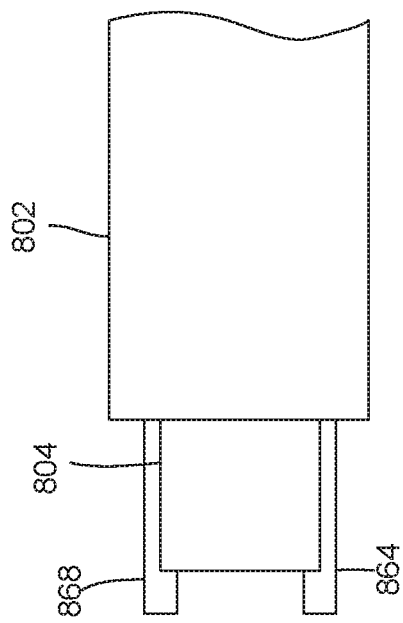

FIGS. 8E and 8F respectively provide schematic illustrations of a side view and end view of the i/o portion 804 of the device 800. The i/o portion 804 includes alignment features 870, such as v-grooves, for aligning the various fibers 810, 818, 828, 836, 842, 850, 856, 864, 868 with their respective waveguides.

The device 800 may be provided with focusing elements disposed between the various fibers and the waveguides within the chip 812, to which they are aligned.

Thus, the device 800 has a first guided optical path for light at λ1 between the common fiber 810 and the first single channel fiber 818, via the first upper waveguide 812 and the second upper waveguide 816, that includes reflection at the first upper filter 814, and a second guided optical path for light at λ2 between the common fiber 810 and the second single channel fiber 828, via the first upper waveguide 812 and the first lower waveguide 820, that includes transmission through the first upper filter 814 and that passes through the retroreflecting portion 808.

Figure 9A:
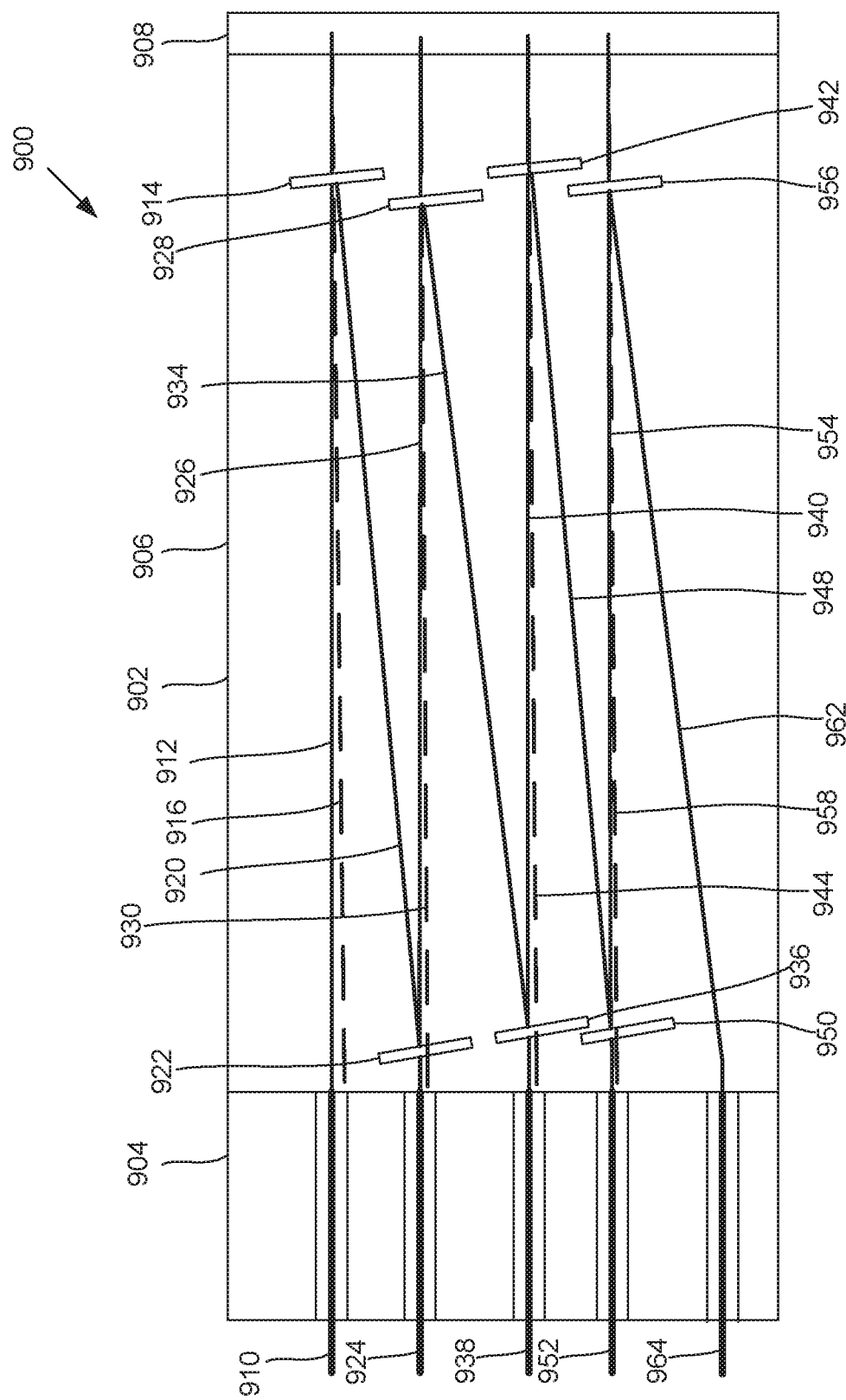
FIG. 9A schematically illustrates a top view of an integrated WDM mux/demux device having a common fiber and the single channel fibers at one of the optical chip that incorporates a retroreflecting portion at an opposite end of the chip, according to another embodiment of the present invention.

It will be understood that various modifications of the double-sided device may be possible. In another embodiment of integrated mux/demux device 900, schematically illustrated in FIG. 9A, the filters may be configured to transmit light at a selected wavelength, while reflecting incident light at the other wavelengths. The device 900 has an optical chip 902 that includes an input/output (i/o) portion 904, a waveguide portion 906 and a retroreflecting portion 908. In the illustrated embodiment, a common fiber 910 is located on the upper side of the i/o portion 904, and is aligned with a first upper waveguide 912 in the waveguide section. An end-on view of the i/o portion 904 is schematically illustrated in FIG. 9B.

The light signal from the common fiber 910 may contain components at different wavelengths. In the illustrated embodiment, the device can multiplex/demultiplex signals at up to eight different wavelengths, λ1, λ2, λ3, λ4, λ5, λ6, λ7 and λ8, although it will be understood that the device may be modified to process signals at different numbers of wavelengths. The combined light signal from the common fiber 910 propagates along the first upper waveguide 912 to a first filter 914, which transmits light at one of the wavelengths, for example λ1, and reflects the other wavelength components, λ2, λ3, λ4, λ5, λ6, λ7 and λ8. The first filter 914 may be included in a well within the chip 902, in a manner like that discussed above. The light signal transmitted by first filter 914 is coupled at the retroreflecting portion 908 to a first lower waveguide 916. The light propagates along the first lower waveguide 916 towards the i/o portion 904 where it couples into a first single channel fiber 918. In FIG. 9A, the first lower waveguide 916 is shown to be non-parallel to the first upper waveguide 912 so that the reader can see where the first lower waveguide is located. This need not be the case and the first lower waveguide 916 may be located underneath, and parallel to, the first upper waveguide, as is indicated by the placement of the first single channel fiber 918 below the common fiber 910 in FIG. 9B.

The light signal reflected by the first filter 914 is directed along a second upper waveguide 920 towards the i/o portion 904. A second filter 922 on the second upper waveguide 920 transmits light at one of the remaining wavelengths, for example light at λ2, and reflects the other wavelength components λ3, λ4, λ5, λ6, λ7 and λ8. The second filter 922 may be included in a well within the chip 902, in a manner like that discussed above. The light signal transmitted by the second filter 922 continues to propagate along the second upper waveguide to the i/o portion, where it is coupled into a second single channel fiber 924.

The light signal reflected by the second filter 922 is directed along a third upper waveguide 926 towards the retroreflecting portion 908. A third filter 928 crosses the third upper waveguide 926 and transmits light at one of the remaining wavelengths, for example light at λ3, and reflects the other wavelength components, λ4, λ5, λ6, λ7 and λ8. The third filter 928 may be included in a well within the chip 902, in a manner like that discussed above. The light signal transmitted by the third filter 928 continues to propagate along the third upper waveguide 926 towards the retroreflecting portion 908 where it is coupled to a second lower waveguide 930. The light travels along the second lower waveguide to the i/o portion 904, where it is coupled to a third single channel fiber 932.

The light signal reflected by the third filter 928 is directed along a fourth upper waveguide 934 towards the i/o portion 904. A fourth filter 936 crosses the fourth upper waveguide 934 and transmits light at one of the remaining wavelengths, for example light at λ4, and reflects the other wavelength components, λ5, λ6, λ7 and λ8. The fourth filter 936 may be included in a well within the chip 902, in a manner like that discussed above. The light signal transmitted by the fourth filter 936 continues to propagate along the fourth upper waveguide 934 towards the i/o portion 904 where it is coupled to a fourth single channel fiber 938.

The light signal reflected by the fourth filter 936 is directed along a fifth upper waveguide 940 towards the retroreflecting portion 908. A fifth filter 942 crosses the fifth upper waveguide 940 and transmits light at one of the remaining wavelengths, for example light at λ5, and reflects the other wavelength components, λ6, λ7 and λ8. The fifth filter 942 may be included in a well within the chip 902, in a manner like that discussed above. The light signal transmitted by the fifth filter 942 continues to propagate along the fifth upper waveguide 940 towards the retroreflecting portion 908 where it is coupled to a third lower waveguide 944. The light travels along the third lower waveguide 944 to the i/o portion 904, where it is coupled to a fifth single channel fiber 946.

The light signal reflected by the fifth filter 942 is directed along a sixth upper waveguide 948 towards the i/o portion 904. A sixth filter 950 crosses the sixth upper waveguide 948 and transmits light at one of the remaining wavelengths, for example light at λ6, and reflects the other wavelength components, λ7 and λ8. The sixth filter 950 may be included in a well within the chip 902, in a manner like that discussed above. The light signal transmitted by the sixth filter 950 continues to propagate along the sixth upper waveguide 948 towards the i/o portion 904 where it is coupled to a sixth single channel fiber 952.

The light signal reflected by the sixth filter 950 is directed along a seventh upper waveguide 954 towards the retroreflecting portion 908. A seventh filter 956 crosses the seventh upper waveguide 954 and transmits light at one of the remaining wavelengths, for example light at λ7, and reflects the remaining wavelength component, λ8. The seventh filter 956 may be included in a well within the chip 902, in a manner like that discussed above. The light signal transmitted by the seventh filter 956 continues to propagate along the seventh upper waveguide 954 towards the retroreflecting portion 908 where it is coupled to a fourth lower waveguide 958. The light propagates along the fourth lower waveguide towards the i/o portion 904 where it is coupled to a seventh single channel fiber 960. The light signal reflected by the seventh filter 956 is directed along an eighth upper waveguide 962 towards the i/o portion 904, where it is coupled to an eighth single channel fiber 964.

The device 900 may be provided with focusing elements disposed between the various fibers and the waveguides within the chip 912, to which they are aligned.

Thus, the device 900 has a first guided optical path for light at λ1 between the common fiber 910 and the first single channel fiber 918, via the first upper waveguide 912 and the first lower waveguide 916, that includes transmission through the first filter 914 and that passes through the retroreflecting portion 908. The device 900 also has a second guided optical path for light at λ2 between the common fiber 910 and the second single channel fiber 924, via the first upper waveguide 912 and the second upper waveguide 920, that includes reflection at the first filter 914.

In another embodiment of the invention, the integrated WDM mux/demux devices are used in matched pairs to compensate for losses through the mux/demux device. In principle, identical mux/demux devices may be used at either end of a fiber link. In practice, however, losses accumulate on propagating through the waveguides and being transmitted and/or reflected by the wavelength selective filters. If identical devices, for example devices 500 as shown in FIG. 5, were used as a mux and a demux at either end of a fiber link, the losses experienced by the signal at λ1 would be less than those experienced by the signal at λ4, because the optical path for the signal at λ1 only passes through one waveguide and one filter between the common fiber and the single channel fiber for λ1, whereas the optical path for the signal at λ4 between the common fiber and the single channel fiber for λ4 passes through four waveguides and reflects off three filters. One way to avoid this imbalance in losses is to use a "matched pair" of mux/demux devices, where the losses are greatest for a signal at a first wavelength, e.g. λ1, and least for a signal at a second wavelength, e.g. λ4 in one device, and are least for the signal at the first wavelength and greatest for the signal at the second wavelength in the other device.

Figure 14:
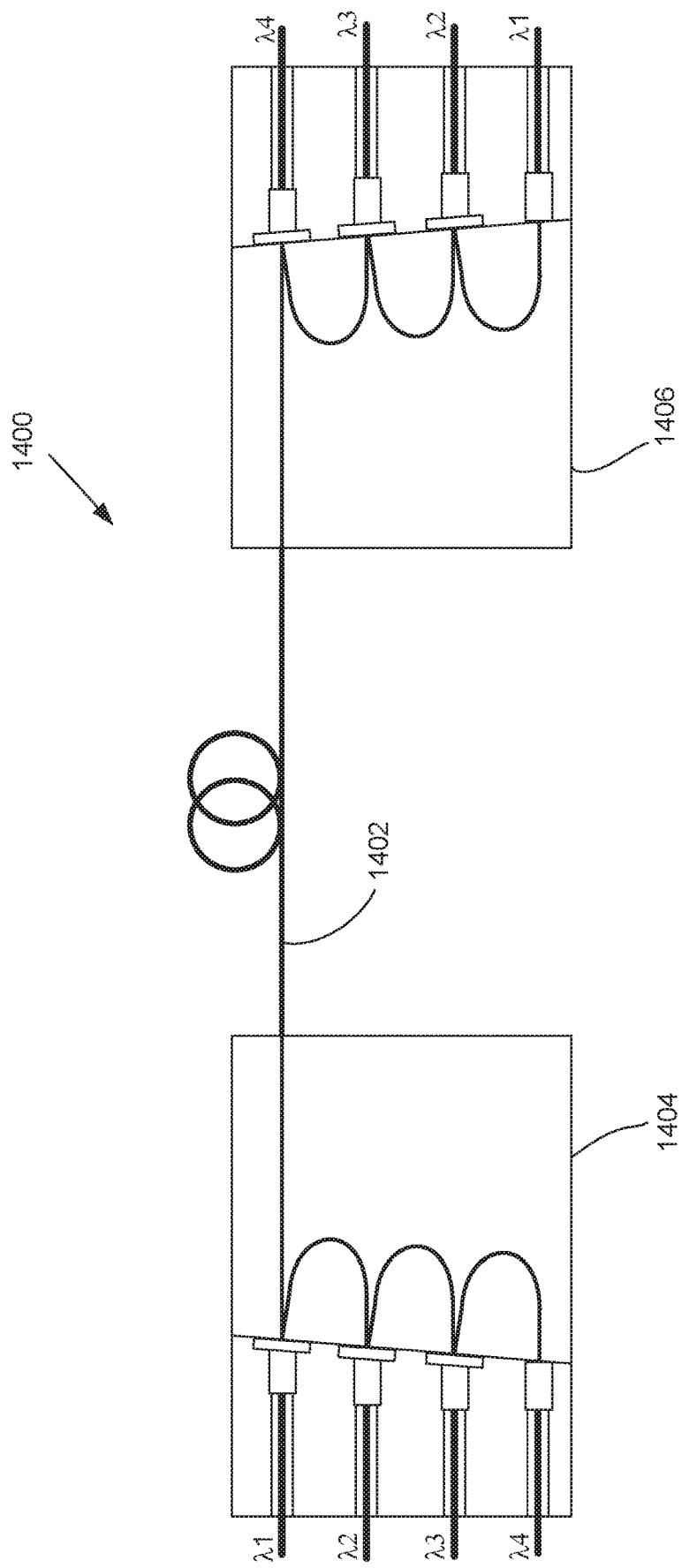
FIG. 14 schematically illustrates an optical system having a matched pair of mux/demux devices, according to an embodiment of the present invention.

This is schematically illustrated in FIG. 14, which shows a fiber system 1400 with an optical fiber 1402 connected between two mux/demux devices 1404, 1406. The input mux 1404 is fed with signals at λ1, λ2, λ3, and λ4. In the illustrated embodiment, the input mux 1404 is similar to the device 500 of FIG. 5, i.e. losses through the device 500 increase for signals at λ1, λ2, λ3 and λ4, due to the increased numbers of waveguides and filters that the optical paths for these signals include. The output mux 1406, on the other hand, has increased losses for signals at λ4, λ3, λ2 and λ1, since the optical path for the signal at λ4 has fewest waveguides and filters to traverse, whereas the signal λ1 has the most waveguides and filters to traverse. By reversing the orders of the optical signals within the output mux 1406 relative to the order in the input mux 1404, the signal at each wavelength, λ1, λ2, λ3 and λ4, passes through the same total number of waveguides and filters between the input single channel fibers on the left and the output single channel fibers on the right, so that all channels see similar losses. This principle may be applied to each of the embodiments of WDM mux/demux device discussed herein.

It will be appreciated that many optical devices can operate on light propagating through the device in different directions. For example, the mux/demux devices such as those discussed above can operate as a wavelength demultiplexer for light signals propagating in one direction through the device and as a wavelength multiplexer for light signals propagating in the opposite direction. Accordingly, although the various devices may have been described in terms of light passing through the device in one direction, it should be understood that the devices described herein may carry optical signals in both directions.

It should be appreciated that, while signals at different wavelength may be designated λ1, λ2, λ3 etc. in the descriptions of the different embodiments of the invention provided herein, there is no intention, unless expressly stated, to imply relative sizes of the wavelengths. For example, in some embodiments, it may be the case that λ1<λ2<λ3 and so on, or that λ1>λ2>λ3 and so on. However, in some embodiments, for example, the value of λ2 need not necessarily lie between the values of λ1 and λ3. Furthermore, while the signals at the different wavelengths are described as being at λ1, λ2, λ3 etc., this is not meant to imply that the signal has only a single wavelength value. In some embodiments, the signal may be within a range that simply includes λ1, λ2, or λ3, where that range may be several nm in width, or broader, or narrower. The term "single wavelength" is used to cover a single wavelength and a single range of wavelengths which is not separated into component sub-parts on the optical device.

Figure 15:
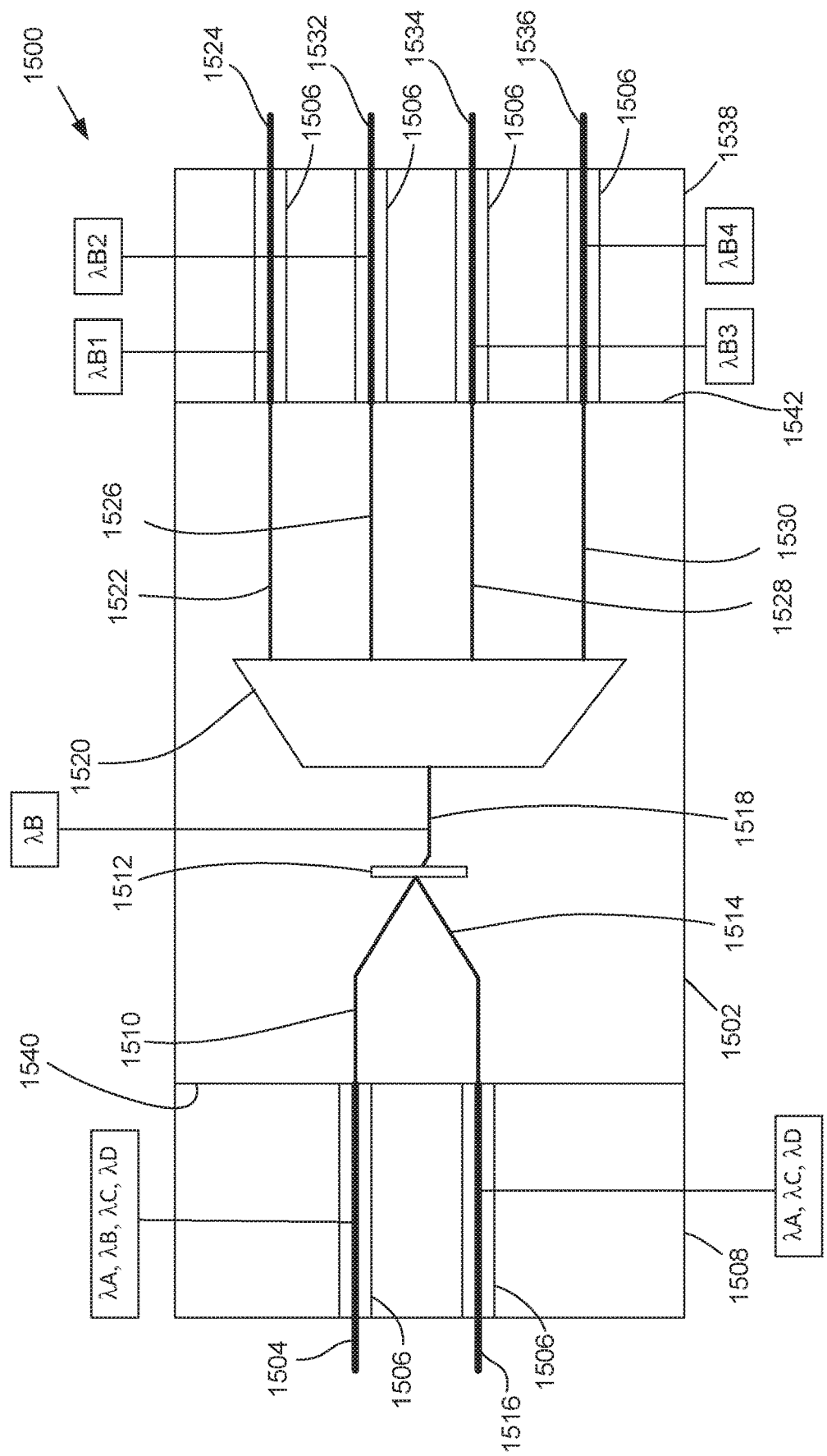
FIG. 15 schematically illustrates an integrated mux/demux device that incorporates a filter band separator and an arrayed waveguide grating (AWG), according to an embodiment of the present invention.

One embodiment of the invention in which a filter may be used to distinguish a range of wavelengths is schematically illustrated in FIG. 15, which shows an integrated mux/demux device 1500 based on an optical chip 1502. In this case, the device 1500 is used to drop or add a number of single wavelengths from a larger number of single wavelengths. The device 1500 includes a first optical fiber 1504 that can carry a WDM optical signal to or from the device 1500. The first optical fiber 1504, like the other optical fibers associated with the device 1500, may be aligned to its associated first waveguide 1510 on the chip 1502 via an alignment feature 1506 on an alignment block 1508. The alignment block may be integrally formed with the chip 1502.

The first waveguide 1510 is traversed by a first filter 1512, which may be positioned within a well in the chip 1502 in the manner described above. A range of wavelengths may be reflected by the first filter 1512 along a second waveguide 1514 to a second optical fiber 1516, while a second range of wavelengths is transmitted by the first optical filter 1512 along another waveguide 1518 to an array waveguide grating (AWG) 1520, such as a cyclic AWG.

The optical signal incident on the AWG 1520 along the waveguide 1518 may be separated into different components by the AWG 1520, each of which is transmitted out of the AWG 1520 along its own single wavelength waveguide. For example, the first single wavelength waveguide 1522 may carry a first single wavelength signal between the AWG 1520 and a first single wavelength fiber 1524. Likewise, second, third and fourth single wavelength waveguides 1526, 1528, 1530 may carry respective single wavelength signals between the AWG 1520 and respective single wavelength fibers 1532, 1534, 1536. The single wavelength optical fibers 1524, 1532, 1534, 1536 may be located in respective alignment features 1506 on alignment block 1538, which may be integral with the chip 1502. In this embodiment, the first and second optical fibers 1504, 1516 are located at a first face 1540 of the chip 1502, while the single wavelength fibers 1524, 1532, 1534, 1536 are located at a second face 1542 of the chip 1502.

In one embodiment, the first optical fiber 1504 may carry a number of signals in different wavelength groups. For example, the first optical fiber may carry signals in four groups: λA, λB, λC and λD. Within each wavelength group there are different single wavelength signals, for example, four or eight single wavelength signals, or maybe some other number. In some embodiments, including the illustrated embodiment, a wavelength group has four single wavelength signals. For example, referring to the illustrated embodiment, signals in four different wavelength groups λA, λB, λC and λD may be incident on the device 1500 along the first optical fiber 1504. If the first filter 1512 transmits one wavelength group, say λB, then the signals in groups λA, λC and λD are reflected along the waveguide 1514. Wavelength group λB is incident at the AWG 1520. The wavelength group λB may contain signals at four different wavelengths, for example λB1, λB2, λB3 and λB4, each of which is output along its respective single wavelength fiber 1524, 1532, 1534, 1536. It will be appreciated, of course, that the device 1500 may operate with a different number of wavelength groups, and that each wavelength group may include a different number of single wavelengths.

Figure 16:
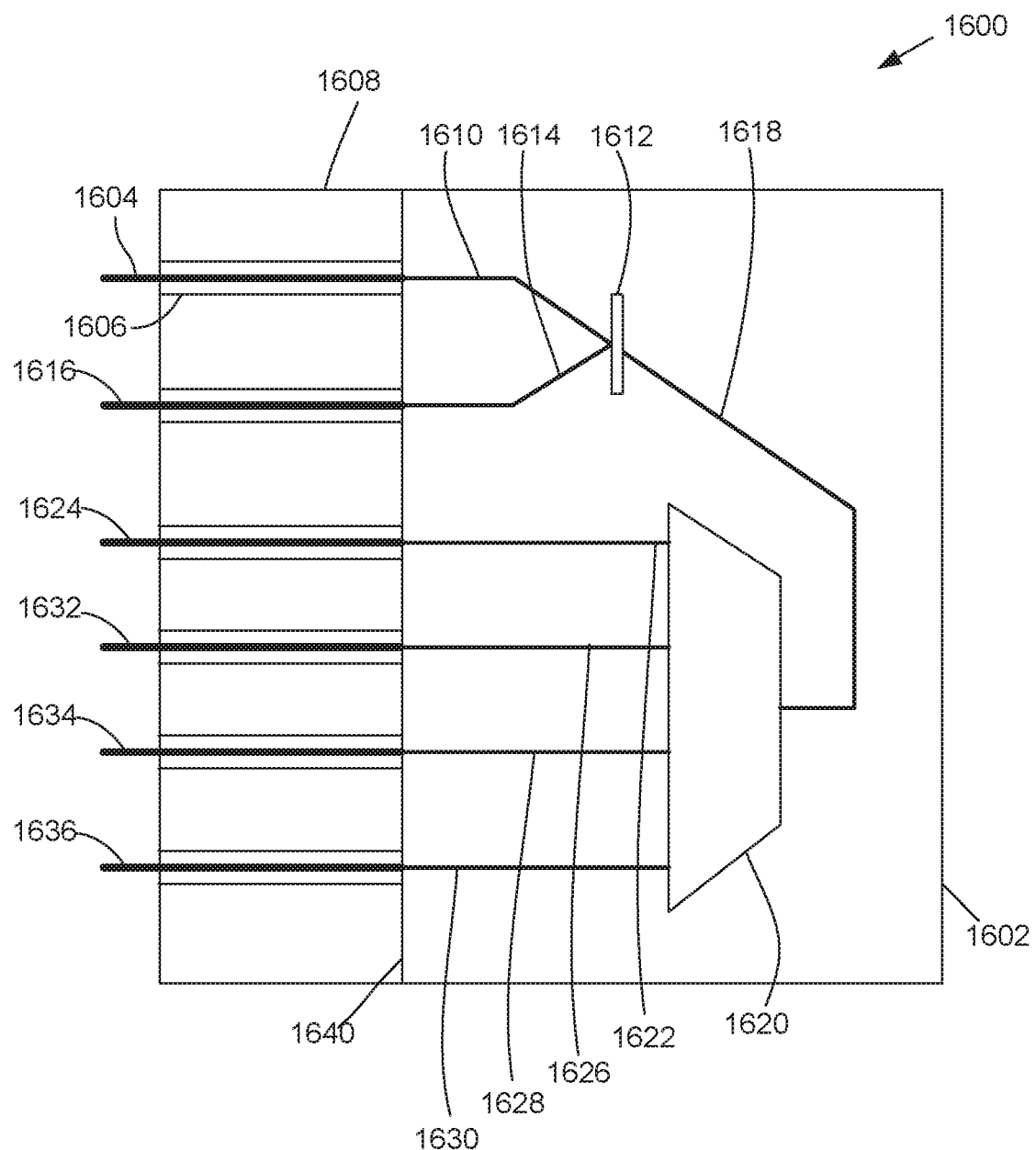
FIG. 16 schematically illustrates an integrated mux/demux device that incorporates a filter band separator and an arrayed waveguide grating (AWG), according to another embodiment of the present invention.
Figure 17:
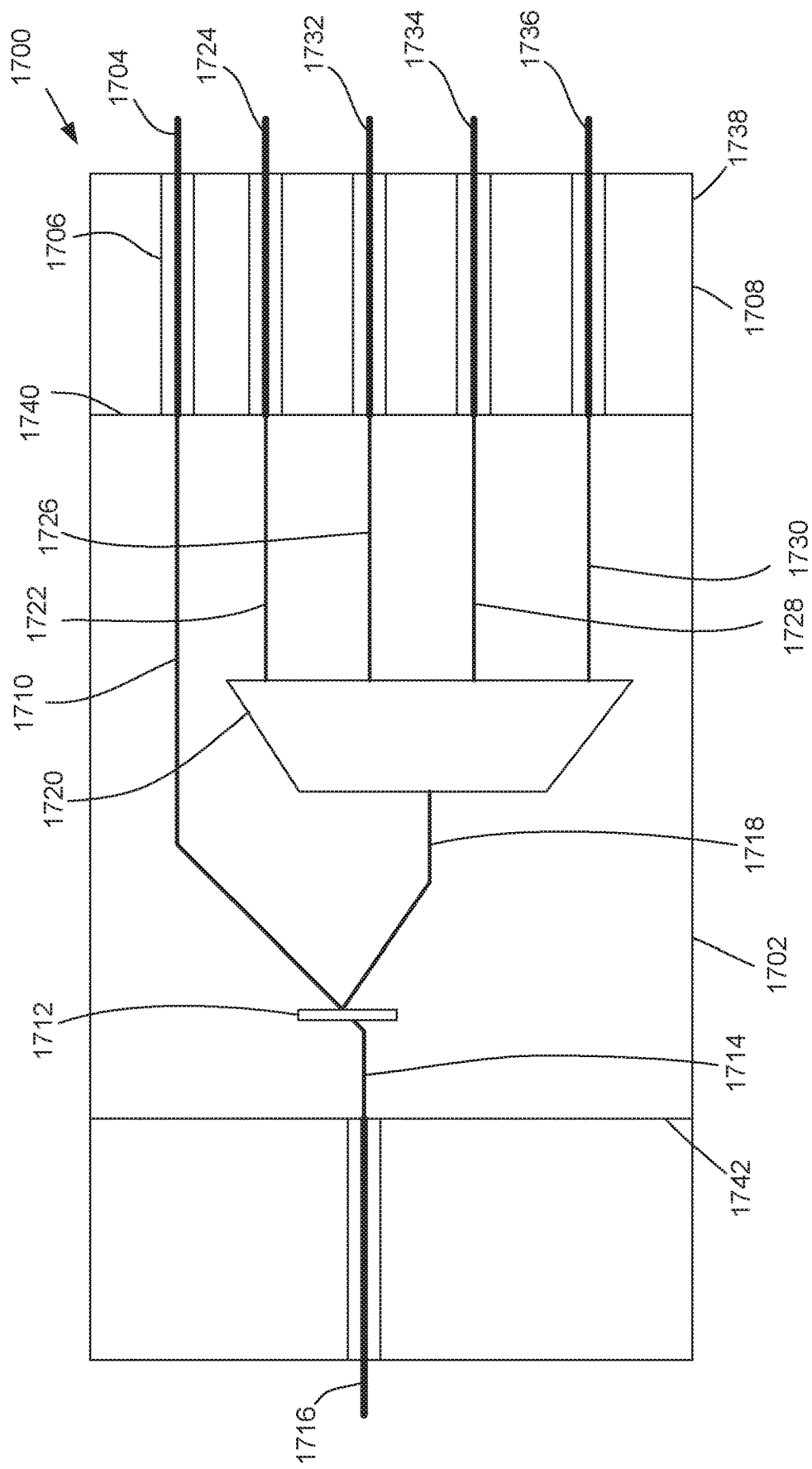
FIG. 17 schematically illustrates an integrated mux/demux device that incorporates a filter band separator and an arrayed waveguide grating (AWG), according to yet another embodiment of the present invention.

Other arrangements of an integrated device including a filter and an AWG may be used. For example, instead of an arrangement as shown in FIG. 15 where the single wavelength fibers are at a different side of a device from the fibers carrying multiple wavelength signals, a device may have the fibers all at one side. Such an arrangement is schematically illustrated in FIG. 16, which shows integrated device 1600. The device 1600 includes a first optical fiber 1604 that can carry a WDM optical signal to or from the device 1600. The first optical fiber 1604, like the other optical fibers associated with the device 1600, may be aligned to its associated first waveguide 1610 on the chip 1602 via an alignment feature 1606 on an alignment block 1608. The alignment block 1608 may be formed integrally with the chip 1602.

The first waveguide 1610 is traversed by a first filter 1612, which may be positioned within a well in the chip 1602 in the manner described above. A range of wavelengths may be reflected by the first filter 1612 along a second waveguide 1614 to a second optical fiber 1616, while a second range of wavelengths is transmitted by the first optical filter 1612 along another waveguide 1618 to an AWG 1620, such as a cyclic AWG.

The optical signal incident on the AWG 1620 along the waveguide 1618 may be separated into different components by the AWG 1620, each of which is transmitted out of the AWG 1620 along its own single wavelength waveguide. For example, the first single wavelength waveguide 1622 may carry a first single wavelength signal between the AWG 1620 and a first single wavelength fiber 1624. Likewise, second, third and fourth single wavelength waveguides 1626, 1628, 1630 may carry respective single wavelength signals between the AWG 1620 and respective single wavelength fibers 1632, 1634, 1636. The single wavelength optical fibers 1624, 1632, 1634, 1636 may be located in respective alignment features 1606 on the alignment block 1608. In this embodiment, the first and second optical fibers 1604, 1616 are located at a first face 1640 of the chip 1602, as are the single wavelength fibers 1624, 1632, 1634, 1636.

Another embodiment of an integrated add/drop device 1700 using an optical filter and an AWG is schematically illustrated in FIG. 1700. The device 1700 includes a first optical fiber 1704 that can carry a WDM optical signal to or from the device 1700. The first optical fiber 1704, like the other optical fibers associated with the device 1700, may be aligned to its associated first waveguide 1710 on the chip 1702 via an alignment feature 1706 on an alignment block 1708. The alignment block 1708 may be formed integrally with the chip 1702.

The first waveguide 1710 is traversed by a first filter 1712, which may be positioned within a well in the chip 1702 in the manner described above. A range of wavelengths may be transmitted by the first filter 1712 along a second waveguide 1714 to a second optical fiber 1716, while a second range of wavelengths is reflected by the first optical filter 1712 along another waveguide 1718 to an AWG 1720, such as a cyclic AWG.

The optical signal incident on the AWG 1720 along the waveguide 1718 may be separated into different components by the AWG 1720, each of which is transmitted out of the AWG 1720 along its own single wavelength waveguide. For example, the first single wavelength waveguide 1722 may carry a first single wavelength signal between the AWG 1720 and a first single wavelength fiber 1724. Likewise, second, third and fourth single wavelength waveguides 1726, 1728, 1730 may carry respective single wavelength signals between the AWG 1720 and respective single wavelength fibers 1732, 1734, 1736. The single wavelength optical fibers 1724, 1732, 1734, 1736 may be located in respective alignment features on the alignment block 1708. In this embodiment, the first optical fiber 1704 is located at a first face 1740 of the chip 1702, as are the single wavelength fibers 1724, 1732, 1734, 1736, while the second optical fiber 1716 is located at a second face 1742 of the optical chip 1702.

Other approaches may be used for an optical device that includes both a wavelength selective filter and an AWG. For example, the illustrated embodiments show direct coupling between the optical fibers and their associated chip waveguides. In other embodiments, focusing elements, such as lenses, may be used to couple light between the fibers and their respective waveguides. In other embodiments still, the wavelength selective filter may be positioned outside the optical chip, for example attached to a face of the optical chip, rather than being located within a well on the chip. In still other embodiments, a device may include two wavelength selective filters, feeding to two different AWGs via reflection and/or transmission.

Various modifications, equivalent processes, as well as numerous structures to which the present invention may be applicable will be readily apparent to those of skill in the art to which the present invention is directed upon review of the present specification. The claims are intended to cover such modifications and devices. For example, the mux/demux devices described herein may be modified to carry more or fewer single wavelength optical channels than described here. Furthermore, the devices, particularly those with filters external to the optical chip, may have its filters mounted perpendicular to a side edge of the chip, rather than being non-perpendicular, with the waveguides within the chip modified to achieve the same optical effect as the illustrated devices. In other embodiments in which the optical fibers are located at more than one face of the chip, the faces at which the fibers are located need not be opposing each other. For example, a rectangular chip may have faces on adjacent sides, where the fibers are located.

As noted above, the present invention is applicable to fiber optical communication and data transmission systems. Accordingly, the present invention should not be considered limited to the particular examples described above, but rather should be understood to cover all aspects of the invention as fairly set out in the attached claims.

What is claimed is:

1. An optical device, comprising:
an optical chip having an input/output portion, a waveguide portion and a retroreflecting portion having a plurality of reflecting surfaces;
a first optical fiber at the input/output portion;
a second optical fiber at the input/output portion;
a third optical fiber at the input/output portion;
a first waveguided optical path through the optical chip between the first optical fiber and the second optical fiber for light at a first wavelength;
a second waveguided optical path through the optical chip between the first optical fiber and the third optical fiber for light at a second wavelength different from the first wavelength;
a first wavelength selective filter disposed to receive light from the first optical fiber, one of the first and second waveguided optical paths including transmission through the first wavelength selective filter and the other of the first and second waveguided optical paths including reflection at the first wavelength selective filter;
wherein at least one of the first and second waveguided optical paths passes through the retroreflecting portion.

2. The optical device as recited in claim 1, further comprising a fourth optical fiber at the input/output portion, a third waveguided optical path through the optical chip between the first optical fiber and the fourth optical fiber for light at a third wavelength different from the first and second wavelengths, and a second wavelength selective filter disposed on one of the second and third optical paths, wherein at least one of the second and third waveguided optical paths includes passing through the retroreflecting portion.

3. The optical device as recited in claim 2, further comprising a fifth optical fiber at the input/output portion, a fourth waveguided optical path through the optical chip between the first optical fiber and the fifth optical fiber for light at a fourth wavelength different from the first, second and third wavelengths, and a third wavelength selective filter disposed on one of the third and fourth waveguided optical paths, wherein at least one of the third and fourth waveguided optical paths includes passing through the retroreflecting portion.

4. The optical device as recited in claim 2, wherein the first wavelength selective filter reflects light at only one of the first and second wavelengths, and the second wavelength selective filter reflects light at only one of the second and third wavelengths.

5. The optical device as recited in claim 2, wherein the first wavelength selective filter is positioned on a first side of the optical chip and the second wavelength selective filter is positioned on a second side of the optical chip opposite the first side.

6. The optical device as recited in claim 2, wherein the first wavelength selective filter and the second wavelength selective filters are positioned on a same side of the optical chip.

7. The optical device as recited in claim 1, the first optical fiber is aligned in a first alignment feature of the input/output portion with a first waveguide of the waveguide portion, the second optical fiber is aligned in a second alignment feature of the input/output portion with a second waveguide of the waveguide portion, and the third optical fiber is aligned in a third alignment feature of the input/output portion with a third waveguide of the waveguide portion.

8. The optical device as recited in claim 1, further comprising a first focusing element between the first optical fiber and the optical chip, a second focusing element between the second optical fiber and the optical chip and a third focusing element between the third optical fiber and the optical chip.

9. The optical device as recited in claim 1, further comprising a second optical device having an optical chip having an input/output portion, a waveguide portion and a retroreflecting portion, the first optical fiber at the input/output portion of the second optical device, a sixth optical fiber at the input/output portion of the second optical device, a seventh optical fiber at the input/output portion of the second optical device, a fifth waveguided optical path through the optical chip of the second optical device between the first optical fiber and the sixth optical fiber for light at the second wavelength, a sixth waveguided optical path through the optical chip of the second optical device between the first optical fiber and the seventh optical fiber for light at the first wavelength, a fourth wavelength selective filter disposed on the optical chip of the second optical device to receive light from the first optical fiber, one of the fifth and sixth guided optical paths including transmission through the fourth wavelength selective filter and the other of the fifth and sixth waveguided optical paths including reflection at the fourth wavelength selective filter, wherein at least one of the fifth and sixth guided optical paths passes through the retroreflecting portion of the second optical device.

* * * * *